US010928182B2

(12) United States Patent
Roos et al.

(10) Patent No.: US 10,928,182 B2
(45) Date of Patent: Feb. 23, 2021

(54) ACCURATE CHIRPED SYNTHETIC WAVELENGTH INTERFEROMETER

(71) Applicant: Bridger Photonics, inc., Bozeman, MT (US)

(72) Inventors: Peter Roos, Bozeman, MT (US); Michael Thorpe, Bozeman, MT (US); Jason Brasseur, Bozeman, MT (US)

(73) Assignee: Bridger Photonics, Inc., Bozeman, MT (US)

( * ) Notice: Subject to any disclaimer, the term of this patent is extended or adjusted under 35 U.S.C. 154(b) by 0 days.

(21) Appl. No.: 16/264,346

(22) Filed: Jan. 31, 2019

(65) Prior Publication Data
US 2019/0170500 A1    Jun. 6, 2019

Related U.S. Application Data

(63) Continuation of application No. 14/925,324, filed on Oct. 28, 2015, now Pat. No. 10,247,538.
(Continued)

(51) Int. Cl.
*G01B 9/02* (2006.01)
*G01B 11/02* (2006.01)
(Continued)

(52) U.S. Cl.
CPC ..... *G01B 9/02007* (2013.01); *G01B 9/02004* (2013.01); *G01B 9/02075* (2013.01);
(Continued)

(58) Field of Classification Search
CPC ............ G01B 9/02007; G01B 9/02004; G01B 9/02075; G01B 9/02062; G01B 9/02083; G01B 9/02084; G01B 11/026; G01S 17/36
See application file for complete search history.

(56) References Cited

U.S. PATENT DOCUMENTS 3,925,666 A    12/1975  Allan et al.
4,593,368 A     6/1986  Fridge et al.
(Continued)

FOREIGN PATENT DOCUMENTS

WO    2010127151 A2    11/2010
WO    2014088650 A1     6/2014
WO    2019079448 A1     4/2019

OTHER PUBLICATIONS

U.S. Appl. No. 16/734,769 titled "Gas-Mapping 3D Imager Measurement Techniques and Method of Data Processing", filed Jan. 6, 2020.
(Continued)

*Primary Examiner* — Tarifur R Chowdhury
*Assistant Examiner* — Jonathon Cook
(74) *Attorney, Agent, or Firm* — Dorsey & Whitney LLP

(57) ABSTRACT

A system is provided for measuring distance or displacement, comprising: first and second laser sources configured to provide first and second laser outputs; a beam combiner configured to receive and combine at least part of the first and second laser outputs into a combined laser output; a signal calibrator configured to receive at least part of the first laser output, the second laser output, or the combined laser output, and output a calibration signal; a plurality of optical paths, including a first optical path, a second optical path, the plurality of optical paths being configured to direct at least part of the combined beam onto an optical detector to produce an interference signal; and a signal processor configured to receive the interference signal and determine a pathlength difference between the first and second optical paths.

23 Claims, 9 Drawing Sheets

Related U.S. Application Data

(60) Provisional application No. 62/181,820, filed on Jun. 19, 2015, provisional application No. 62/069,917, filed on Oct. 29, 2014.

(51) Int. Cl.
| | |
|---|---|
| *H04B 10/071* | (2013.01) |
| *H04B 10/079* | (2013.01) |
| *H04B 10/516* | (2013.01) |

(52) U.S. Cl.
CPC ......... *G01B 11/026* (2013.01); *H04B 10/071* (2013.01); *H04B 10/07953* (2013.01); *H04B 10/5165* (2013.01)

(56) References Cited

U.S. PATENT DOCUMENTS

| | | | |
|---|---|---|---|
| 4,795,253 | A | 1/1989 | Sandridge et al. |
| 4,830,486 | A | 5/1989 | Goodwin |
| 5,367,399 | A | 11/1994 | Kramer |
| 5,371,587 | A | 12/1994 | De Groot et al. |
| 5,534,993 | A | 7/1996 | Ball et al. |
| 5,768,001 | A | 6/1998 | Kelley et al. |
| 5,859,694 | A | 1/1999 | Galtier et al. |
| 6,822,742 | B1 | 11/2004 | Kalayeh et al. |
| 6,864,983 | B2 | 3/2005 | Galle et al. |
| 7,215,413 | B2 | 5/2007 | Soreide et al. |
| 7,292,347 | B2 | 11/2007 | Tobiason et al. |
| 7,511,824 | B2 | 3/2009 | Sebastian et al. |
| 7,742,152 | B2 | 6/2010 | Hui et al. |
| 7,920,272 | B2 | 4/2011 | Sebastian et al. |
| 8,010,300 | B1 | 8/2011 | Stearns et al. |
| 8,121,798 | B2 | 2/2012 | Lippert et al. |
| 8,294,899 | B2 | 10/2012 | Wong |
| 8,582,085 | B2 | 11/2013 | Sebastian et al. |
| 8,730,461 | B2 | 5/2014 | Andreussi |
| 8,781,755 | B2 | 7/2014 | Wong |
| 9,030,670 | B2 | 5/2015 | Warden et al. |
| 9,559,486 | B2 | 1/2017 | Roos et al. |
| 9,759,597 | B2 | 9/2017 | Wong |
| 9,784,560 | B2 | 10/2017 | Thorpe et al. |
| 9,864,060 | B2 | 1/2018 | Sebastian et al. |
| 9,970,756 | B2 | 5/2018 | Kreitinger et al. |
| 10,247,538 | B2 | 4/2019 | Roos et al. |
| 2002/0071122 | A1 | 6/2002 | Kulp et al. |
| 2003/0043437 | A1 | 3/2003 | Stough et al. |
| 2004/0105087 | A1 | 6/2004 | Gogolla et al. |
| 2005/0094149 | A1 | 5/2005 | Cannon |
| 2006/0050270 | A1 | 3/2006 | Elman |
| 2008/0018881 | A1 | 1/2008 | Hui et al. |
| 2008/0018901 | A1 | 1/2008 | Groot |
| 2009/0046295 | A1 | 2/2009 | Kemp et al. |
| 2009/0110004 | A1 | 4/2009 | Chou et al. |
| 2009/0153872 | A1 | 6/2009 | Sebastian et al. |
| 2009/0257622 | A1 | 10/2009 | Wolowelsky et al. |
| 2010/0091278 | A1 | 4/2010 | Liu et al. |
| 2010/0131207 | A1 | 5/2010 | Lippert et al. |
| 2011/0164783 | A1 | 7/2011 | Hays et al. |
| 2011/0205523 | A1 | 8/2011 | Rezk et al. |
| 2011/0213554 | A1 | 9/2011 | Archibald et al. |
| 2011/0273699 | A1 | 11/2011 | Sebastian et al. |
| 2011/0292403 | A1 | 12/2011 | Jensen et al. |
| 2012/0038930 | A1* | 2/2012 | Sesko ............... G01B 11/026 356/486 |
| 2012/0106579 | A1 | 5/2012 | Roos et al. |
| 2013/0104661 | A1 | 5/2013 | Klotz et al. |
| 2014/0036252 | A1 | 2/2014 | Amzajerdian et al. |
| 2014/0139818 | A1 | 5/2014 | Sebastian et al. |
| 2014/0204363 | A1 | 7/2014 | Slotwinski et al. |
| 2015/0019160 | A1* | 1/2015 | Thurner ............ G01B 9/02007 702/150 |
| 2015/0185313 | A1 | 7/2015 | Zhu |
| 2016/0123718 | A1 | 5/2016 | Roos et al. |
| 2016/0123720 | A1 | 5/2016 | Thorpe et al. |
| 2016/0202225 | A1 | 7/2016 | Feng et al. |
| 2016/0259038 | A1 | 9/2016 | Retterath et al. |
| 2017/0097274 | A1 | 4/2017 | Thorpe et al. |
| 2017/0097302 | A1 | 4/2017 | Kreitinger et al. |
| 2017/0115218 | A1 | 4/2017 | Huang et al. |
| 2017/0191898 | A1 | 7/2017 | Rella et al. |
| 2017/0343333 | A1 | 11/2017 | Thorpe et al. |
| 2018/0188369 | A1 | 7/2018 | Sebastian et al. |
| 2018/0216932 | A1 | 8/2018 | Kreitinger et al. |
| 2019/0013862 | A1 | 1/2019 | He et al. |
| 2019/0285409 | A1 | 9/2019 | Kreitinger et al. |
| 2019/0383596 | A1 | 12/2019 | Thorpe et al. |

OTHER PUBLICATIONS

Emran, Bara J. et al., "Low-Altitude Aerial Methane Concentration Mapping", School of Engineering, The University of British Columbia, Aug. 10, 2017, pp. 1-12.

Fransson, Karin et al., "Measurements of VOCs at Refineries Using the Solar Occultation Flux Technique", Department of Radio and Space Science, Chalmers University of Technology, 2002, 1-19.

Lenz, Dawn et al., "Flight Testing of an Advanced Airborne Natural Gas Leak Detection System", ITT Industries Space Systems Division, Oct. 2005, all.

Mather, T.A. et al., "A reassessment of current volcanic emissions from the Central American arc with specific examples from Nicaragua", Journal of Volcanology and Geothermal Research, Nov. 2004, 297-311.

Thoma, Eben D. et al., "Open-Path Tunable Diode Laser Absorption Spectroscopy for Acquisition of Fugitive Emission Flux Data", Journal of the Air & Waste Management Association (vol. 55), Mar. 1, 2012, 658-668.

Zhao, Yanzeng et al., "Lidar Measurement of Ammonia Concentrations and Fluxes in a Plume from a Point Source", Cooperative Institute for Research in Environmental Studies, University of Colorado/NOAA (vol. 19), Jan. 2002, 1928-1938.

U.S. Appl. No. 16/966,451 titled "Apparatuses and Methods for Gas Flux Measurements", filed Jul. 30, 2020.

U.S. Appl. No. 16/551,075 titled "Length Metrology Apparatus and Methods for Suppressing Phase Noise-Induced Distance Measurement Errors", filed Aug. 26, 2019.

International Search Report dated Feb. 16, 2016 for International Application No. PCT/US2015/057814.

PCT Application No. PCT/US2018/56285 titled "Apparatuses and Methods for a Rotating Optical Reflector", filed Oct. 17, 2018, pp. all.

International Search Report and Written Opinion for PCT Application No. PCT/US2018/056285 dated Dec. 20, 2018, pp. all.

"International Search Report and Written Opinion received for PCT/US2015/057814 dated Feb. 16, 2016".

Amann, et al., ""Laser ranging: a critical review of usual techniques for distance measurement," Optical Engineering, vol. 40(1) pp. 10-19 (Jan. 2001)".

Barber, et al., ""Accuracy of Active Chirp Linearization for Broadband Frequency Modulated Continuous Wave Ladar," Applied Optics, vol. 49, No. 2, pp. 213-219 (Jan. 2010)".

""Performance enhancement of intensity-modulated laser rangefinders on natural surfaces"", SPIE vol. 5606, pp. 161-168 (Dec. 2004).

Baumann, et al., ""Speckle Phase Noise in Coherent Laser Ranging: Fundamental Precision Limitations," Optical Letters, vol. 39, Issue 16, pp. 4776-4779 (Aug. 2014)".

Blateyron ""Chromatic Confocal Microscopy, in Optical Measurement of Surface Topography," Springer Berlin Heidelber, pp. 71-106 (Mar. 2011)".

Boashash, , ""Estimating and Interpreting the Instantaneous Frequency of a Signal-Part 2: Algorithms and Applications"", Proceedings of the IEEE, vol. 80, No. 4, pp. 540-568 (Apr. 1992).

Bomse, et al., ""Frequency modulation and wavelength modulation spectroscopies: comparison of experimental methods using a lead-salt diode laser"", Appl. Opt., 31, pp. 718-731 (Feb. 1992).

Choma, et al., ""Sensitivity Advantage of Swept Source and Fourier Domain Optical Coherence Tomography," Optical Express, vol. 11, No. 18, 2183 (Sep. 2003)".

(56) References Cited

OTHER PUBLICATIONS

Ciurylo, , "'Shapes of pressure- and Doppler-broadened spectral lines in the core and near wings'", Physical Review A, vol. 58 No. 2, pp. 1029-1039 (Aug. 1998).

Dharamsi, , "A theory of modulation spectroscopy with applications of higher harmonic detection", J. Phys. D: Appl. Phys 29, pp. 540-549 (Jun. 1995;1996) (Retrieved Jan. 16, 2017).

Fehr, et al., "'Compact Covariance Descriptors in 3D Point Clouds for Object Recognition'", 2012 IEEE International Conference on Robotics and Automation, pp. 1793-1798, (May 2012).

Fujima, et al., "'High-resolution distance meter using optical intensity modulation at 28 GHz'", Meas. Sci. Technol. 9, pp. 1049-1052 (May 1998).

Gilbert, et al., "'Hydrogen Cyanide H13C14N Absorption Reference for 1530 nm to 1565 nm Wavelength Calibration—SRM 2519a'", NIST Special Publication 260-137 2005 ED, 29 pages, (Aug. 2005).

Guest, , "'Numerical Methods of Curve Fitting'", Cambridge University Press; Reprint edition, ISBN: 9781107646957 (Dec. 2012).

Harald, , "'Mathematical Methods of Statistics'", Princeton University Press, ISBN 0-691-08004-6 (1946).

Hariharan, , "'Basics of Interferometry'", Elsevier Inc. ISBN 0-12-373589-0 (2007).

Iseki, et al., "'A Compact Remote Methane Sensor using a Tunable Diode Laser'", Meas. Sci. Technol., 11, 594, pp. 217-220 (Jun. 2000).

Jia-Nian, et al., "'Etalon effects analysis in tunable diode laser absorption spectroscopy gas concentration detection system based on wavelength modulation spectroscopy'", IEEE SOPO, pp. 1-5 (Jul. 2010).

Johnson, et al., "'Using Spin-Images for Efficient Object Recognition in Cluttered 3D Scenes'", IEEE Transactions on Pattern Analysis and Machine Intelligence, vol. 21, No. 5, 37 pages (Published May 1999).

Karmacharya, et al., "'Knowledge guided object detection and indentification in 3D point clouds'", SPIE 9528, 952804-952804-13 (Jun. 2015).

Lu, et al., "Differential wavelength-scanning heterodyne interferometer for measuring large step height", Applied Optics, vol. 41, No. 28, Oct. 1, 2002.

Masiyano, et al., "'Use of diffuse reflections in tunable diode laser absorption spectroscopy: implications of laser speckle for gas absorption measurements'", Appl. Phys. B 90, pp. 279-288 (Feb. 2008).

Ngo, et al., "'An isolated line-shape model to go beyond the Voigt profile in spectroscopic databases and radiative transfer codes'", Journal of Quantitative Spectroscopy and Radiative Transfer, 129, pp. 89-100 (Nov. 2013).

Olsovsky, et al., "'Chromatic Confocal Microscopy for Multi-depth Imaging of Epithelial Tissue," Biomedical Optics Express, vol. 4, No. 5, pp. 732-740 (May 2013)".

Paffenholz, "'Direct geo-referencing of 3D point clouds with 3D positioning sensors'", (Doctoral Thesis), Leibniz Universität Hannover, 138 pages (Sep. 2012).

Polyanksy, et al., "'High-Accuracy CO2 Line Intensities Determined from Theory and Experiment'", Physical Review Letters, 114, 5 pages (Jun. 2015).

Rao, , "'Information and the accuracy attainable in the estimatin of statistical parameters'", Bull. Calcutta Math. Soc., 37,pp. 81-89 (1945, reprinted 1992) (Retrieved Jan. 10, 2017).

Riris, et al., "'Airborne measurements of atmospheric methane column abundance using a pulsed integrated-path differential absorption lidar'", Applied Optics, vol. 51, No. 34, pp. 8296-8305 (Dec. 2012).

Roos, et al., "'Ultrabroadband optical chirp linearization for precision metrology application'", Optics Letters, vol. 34 No. 23, pp. 3692-3694 (Dec. 2009).

Rothman, et al., "'The HITRAN 2008 molecular spectroscopic database'", Journal of Quantitative Spectroscopy & Radiative Transfer, 110, pp. 533-572 (Jul. 2009).

Rusu, et al., "'Fast Point Feature Histograms (FPFH) for 3D Registration'", IEEE Int. Conf. Robot., pp. 3212-3217 (May 2009).

Sandsten, et al., "'Volume flow calculations on gas leaks imaged with infrared gas-correlation'", Optics Express, vol. 20, No. 18, pp. 20318-20329 (Aug. 2012).

Sheen, , "'Frequency Modulation Spectroscopy Modeling for Remote Chemical Detection'", PNNL 13324, 51 pages (Sep. 2000).

Silver, , "'Frequency-modulation spectroscopy for trace species detection: theory and comparison among experimental methods'", Appl. Opt., vol. 31 No. 6, pp. 707-717 (Feb. 1992).

Sirat, et al., "'Conoscopic Holography," Optics Letters, vol. 10, No. 1 (Jan. 1985)".

Stone, et al., "'Performance Analysis of Next-Generation LADAR for Manufacturing, Construction, and Mobility," NISTIR 7117 (May 2004)".

Twynstra, et al., "'Laser-absorption tomography beam arrangement optimization using resolution matrices'", Applied Optics, vol. 51, No. 29, pp. 7059-7068 (Oct. 2012).

Xi, et al., "Generic real-time uniorm K-space sampling method for high-speed swept-Source optical cohernece tomography", Optics Express, vol. 18, No. 9, pp. 9511-9517 (Apr. 2010).

Zakrevskyy, et al., "'Quantitative calibration- and reference-free wavelength modulation spectroscopy'", Infrared Physics & Technology, 55. pp. 183-190 (Mar. 2012).

Zhao, et al., "'Calibration-free wavelength-modulation spectroscopy based on a swiftly determined wavelength-modulation frequency response function of a DFB laser'", Opt. Exp., vol. 24 No. 2, pp. 1723-1733 (Jan. 2016).

* cited by examiner

ACCURATE CHIRPED SYNTHETIC WAVELENGTH INTERFEROMETER

CROSS-REFERENCE TO RELATED APPLICATION

This application is a continuation of U.S. patent application Ser. No. 14/925,324 filed on Oct. 28, 2015 and issued as U.S. Pat. No. 10,247,538 on Apr. 2, 2019, which application claims priority to U.S. Provisional Application No. 62/181,820 filed Jun. 19, 2015 and U.S. Provisional Application No. 62/069,917 filed Oct. 29, 2014 The aforementioned applications and patent are incorporated by reference herein in their entirety and for all purposes.

FIELD OF THE INVENTION

The present invention generally relates to the field of optical sensors for distance and length metrology. Specifically, the invention relates to chirped synthetic-wavelength interferometry.

BACKGROUND

Traditional interferometry is a well-known and potentially highly precise technique that uses the optical phase of a laser with stable optical frequency to measure physical displacement of a surface. (Hariharan, P. (2007). Basics of Interferometry. Elsevier Inc. ISBN 0-12-373589-0.) However, traditional interferometers struggle to achieve absolute distance measurements due to the well-known "fringe ambiguity" problem where the phase value used for detecting distance repeats every integer number of wavelengths of distance. One must therefore know this integer to measure absolute distance, which can be very challenging for optical wavelengths and macroscopic distances. As a result, traditional interferometers typically measure displacement of a surface rather than absolute distance to a surface or separation between multiple surfaces. To create a larger unambiguous measurement region, multiple lasers with stable optical frequencies can be used to synthesize a longer effective wavelength than that of either of the two constituent lasers. This so-called synthetic wavelength interferometry (SWI) has the benefit that determining the integer number of (larger) synthetic wavelengths, and therefore the absolute distance, is easier from a practical standpoint.

Another major drawback of traditional interferometry is that reflections from multiple surfaces can cause measurement errors. This occurs because traditional interferometers measure the combined field phase from all surfaces. Therefore all surfaces in the measurement path have the potential to influence the measured phase and corrupt the measurement.

In contrast to interferometry, various techniques for measuring absolute distances (not just displacement) to surfaces or separations between surfaces by optical means are also known. These techniques include laser triangulation, conoscopic holography, chromatic confocal sensing, frequency-modulated continuous-wave (FMCW) laser radar, swept-frequency optical coherence tomography, and phase modulation range finding. Examples of this can be found in: F. Blateyron, Chromatic Confocal Microscopy, in Optical Measurement of Surface Topography, (Springer Berlin Heidelberg) pp 71-106 (2011), C. Olsovsky, et al., "Chromatic confocal microscopy for multi-depth imaging of epithelial tissue," Biomed Opt Express. May 1, 2013; 4(5): 732-740, G. Y. Sirat et al., "Conoscopic holography," Opt. Lett. 10, (1985), W. C. Stone, et al., "Performance Analysis of Next-Generation LADAR for Manufacturing, Construction, and Mobility," NISTIR 7117, May 2004, and M. A. Choma, "Sensitivity advantage of swept source and Fourier domain optical coherence tomography," Opt. Exp. 11 (18), 2183 (2003). These techniques offer varying levels and combinations of measurement ranges, precisions, and resolutions. However, none of these techniques can match the precision of the best traditional interferometry. Fundamentally, this is because the achievable range resolution of absolute distance measurement techniques (that do not exhibit fringe ambiguity) is limited by the information bandwidth (B) through the relation.

$$\Delta R_{abs} = c/2B, \tag{1}$$

where c is the speed of light and it has been assumed the measurements are made in vacuum. The analogous interferometric techniques (that do exhibit fringe ambiguity) are limited instead by (half of) the measurement wavelength (including synthetic wavelength) through the relation:

$$\Delta R_{int} = \lambda/2 = c/2\nu \tag{2}$$

where $\nu$ is the optical frequency. In both cases, the achievable measurement precision (or repeatability), defined as the standard deviation of measurements made under identical conditions, is given approximately by the Cramer Rao lower bound, (Cramér, Harald, "Mathematical Methods of Statistics," (Princeton University Press), ISBN 0-691-08004-6), 1946; Rao, Calyampudi, "Information and the accuracy attainable in the estimation of statistical parameters," Bull. Calcutta Math. Soc, 37, pp 81-89, 1945), $$\sigma = \Delta R / \sqrt{SNR} \tag{3}$$

where SNR is the electrical power signal-to-noise ratio. Quite simply, because $\nu$ can be made larger than B in practice, the precision of an interferometer can be made better than an absolute distance measurement technique with the same SNR.

Important prior art has worked to combine interferometry with absolute distance measurement techniques to achieve interferometric performance without fringe ambiguity. In U.S. Pat. No. 5,371,587 issued to de Groot et al., which is incorporated herein by reference in its entirety, the authors combined synthetic wavelength interferometry with chirped FMCW laser radar, so-called chirped SWI, and achieved 3 µm root-mean-square standard deviation measurements of distance. As disclosed in U.S. Pat. No. 7,215,413, Soreide et al. demonstrate improvements to the work of de Groot by reducing the complexity of the optical system involved and by incorporating a plurality of reference interferometers and processing to account for the nonlinearities in the optical frequency chirp. As disclosed in U.S. Pat. No. 7,292,347, Tobiason, et al. disclose using quadrature detection, which also simplifies the work of de Groot. In U.S. Pat. No. 9,030,670, Warden et al., disclose a different processing method from Soreide et al. to calculate the distance. More recently, in U.S. Patent Application 2015/0019160 A1, Thurner, et al. disclose adding modulation and demodulation as a method of wavelength multiplexing and demultiplexing, stabilizing the lasers to gas absorption lines, and processing techniques for coping with the nonlinearities in the optical phase.

While some of the different realizations of chirped SWI have produced desirable results, all of the prior art suffers from significant drawbacks. First, the resolution, precision, and accuracy of the results are either limited by nonlinearities in the laser frequency chirp, or complex components and processing must be used to mitigate the frequency chirp nonlinearities. Second, prior art uses either reference interferometers or lasers stabilized to molecular gas absorption lines as length references. However, physical interferometers are susceptible to environmental and mechanical perturbations and are not inherently linked to fundamental atomic or molecular absorption lines. Moreover, stabilization to an absorption line adds complexity and can limit the speed and bandwidth of the laser chirp. Third, the prior art does not teach how to solve the problem of measurement errors due to multiple surface reflections or sub-resolved surface reflections. And finally, none of the prior art teaches how to account for the optical phase shift that can occur upon certain reflections (e.g. from low to high index materials) to enable an accurate absolute distance measurements.

The invention described herein teaches how the prior art may be significantly improved by utilizing highly linearized frequency modulated lasers such as, but not limited to, that disclosed in recently disclosed in Peter A. Roos, Randy R. Reibel, Trenton Berg, Brant Kaylor, Zeb W. Barber, and Wm. Randall Babbitt, "Ultrabroadband optical chirp linearization for precision metrology applications," Opt. Lett. 34, 3692-3694 (2009), how sweeping over, rather than stabilizing to, spectroscopic absorption lines can be used to directly and fully calibrate length, and how multiple surfaces can be measured simultaneously without traditional interferometric errors, even if they are sub-resolved. The preferred embodiment of this invention enables absolute distance measurements with interferometric precision and accuracy limited by a fundamental NIST-traceable spectroscopic gas absorption frequency.

SUMMARY

A system is provided, for measuring distance or displacement, comprising: a first laser source configured to provide a first laser output; a second laser source configured to provide a second laser output; a beam combiner configured to receive and combine at least part of the first and second laser outputs into a combined laser output; and a signal calibrator configured to receive at least part of the first laser output, the second laser output, or the combined laser output, and output a calibration signal; a plurality of optical paths, including a first optical path, a second optical path, the plurality of optical paths being configured to direct at least part of the combined beam onto an optical detector to produce an interference signal; a signal processor configured to receive the interference signal and determine a pathlength difference between the first and second optical paths, wherein the first and second laser sources may be a single laser source, the calibration signal includes information to calibrate the pathlength difference between the first and second optical paths or the displacement of the one optical path with respect to the other optical path, an optical frequency of at least one of the laser outputs is modulated linearly in time over a bandwidth of approximately 10 GHz or greater and with deviations from linearity relative to a measurement clock not exceeding approximately 10 MHz for more than about 10% of the linear modulation period that is used for calculating distance, and the determination of distance uses the phase of the interference signal.

The system may further comprise an active electronic element used to linearize the modulation.

The system may further comprise a passive element used to linearize the modulation.

A measurement clock rate may be adjusted to make the laser modulation linearized relative to the measurement clock rate.

A system for measuring pathlength difference is provided, comprising a first laser source configured to provide a first laser output; a second laser source configured to provide a second laser output; a beam combiner configured to receive and combine at least part of the first laser output and the second laser output into a combined laser output; a signal calibrator configured to receive at least part of the first laser output, the second laser output, or the combined laser output, the signal calibrator including a spectroscopic gas cell having at least one gas absorption optical frequency being within a linear modulation bandwidth of at least one of the first, second, or combined laser outputs, and the signal calibrator being further configured to determine at least one of the linear modulation chirp rate or the optical frequency of a linearly modulated laser output at at least one point during the linear modulation period without active stabilization of the laser to a gas absorption optical frequency; a plurality of optical paths including a first optical path and a second optical path, the plurality of optical paths being configured to direct at least part of the combined beam onto an optical detector to produce an interference signal; and a signal processing portion configured to receive the interference signal and information from the signal calibrator, and to determine a calibrated pathlength difference between the first and second optical paths wherein the determination of distance uses the phase of the interference signal. wherein the first and second laser sources may be a single laser source, and the optical frequency of at least one of the first and second laser outputs is modulated linearly in time.

The spectroscopic gas may comprise hydrogen cyanide; the spectroscopic gas may comprise Acetylene; or the spectroscopic gas may comprise Rubidium.

The spectroscopic gas lines of the spectroscopic gas may be chosen to provide better stability compared to the other available gas lines.

A system for measuring pathlength difference or change is provided, comprising: a laser source configured to output an optical frequency that is modulated linearly in time to produce a linearly modulated laser output; an optical sideband modulator configured to receive the linearly modulated laser output and produce a doubly modulated beam that exhibits at least one sideband on the linearly modulated optical frequency, wherein the optical sideband modulator may be internal to the laser source; a plurality of optical paths, including a first optical path and a second optical path, the plurality of optical paths being configured to direct at least part of the doubly modulated beam through an optical demodulator; an optical demodulator configured to demodulate the doubly modulated beam before detection by the optical detector; an optical detector configured to produce an interference signal based on interference between light from the first and second optical paths; a processor configured to distinguish the interference signal contributions that are due to the sidebands from one another and from the carrier, and additionally configured to determine a pathlength difference between the first and second optical paths based on the frequency and phase of the interference signal contributions that result from the sidebands or carrier.

The system may further comprise an optical splitter configured to separate the linearly modulated laser output into a local oscillator portion and a transmitted portion, wherein the optical sideband modulator is placed in a transmit path anywhere after the optical splitter.

An optical splitter may separate the linearly modulated laser output into a local oscillator portion and a transmitter portion, and the optical modulator and optical demodulator may be placed in the transmitter portion after the optical splitter.

A system for measuring pathlength difference or change is provided, comprising: a laser source configured to output an optical frequency that is modulated linearly in time to produce a linearly modulated laser output; a plurality of optical paths, including a first optical path configured to direct at least part of a first portion of the linearly modulated laser output through a first optical modulator; and a second optical path configured to direct at least part of a second portion of the linearly modulated laser output through a second optical modulator; a first optical sideband modulator placed in the first optical path and configured to impart at least one sideband on the first linearly modulated optical frequency; a second optical sideband modulator placed in the second optical path and configured to impart at least one sideband on the second linearly modulated optical frequency; an optical detector configured to receive at least the first and second linearly modulated optical frequencies and additionally configured to produce an interference signal based on interference between light from the first and second optical paths; a processor configured to distinguish the interference signal contributions that are due to the sidebands from one another and from the carrier, and additionally configured to determine a pathlength difference between the first and second optical paths based on the frequency and phase of the interference signal contributions that result from the sidebands or carrier.

A method is provided of determining pathlength difference between multiple surfaces, comprising: producing a first laser output having a first optical frequency; producing a second laser output having a second optical frequency; modulating at least one of the first or second optical frequency; producing a combined beam which is the combination of the first and second laser outputs; directing the combined beam through at least a first, a second, and a third optical path, wherein the plurality of optical paths are configured to direct at least part of the combined beam onto an optical detector to produce a combined interference signal; distinguishing the combined interference signal contributions that result from the first and second laser outputs; distinguishing a first interference signal contribution that results from the first and second optical paths from a second interference signal contribution that results from the first and third optical paths by applying electronic or digital filtering; and processing one or both of the first interference signal contributions and the second interference signal contributions to determine the pathlength difference between the first and second optical paths, the pathlength difference between the first and third optical paths, or the pathlength difference between the second and third optical paths.

The determination of distance may use the interference signal frequency and phase.

A method is provided of determining pathlength difference for multiple sub-resolved pathlengths, comprising: producing a laser output having an optical frequency; modulating the optical frequency to produce a modulated laser output; directing the modulated laser output through a first, a second, and a third optical path wherein the optical paths are configured to direct at least part of the modulated beam onto an optical detector to produce an interference signal; and processing the interference signal to determine the pathlength difference between the first and second optical paths, the pathlength difference between the first and third optical paths, or the pathlength difference between the second and third optical paths by applying a fitting operation, wherein the fitting operation uses at least, interference signal frequencies and phases corresponding to pathlength differences as fitting parameters.

The fitting parameters may include a number of pathlength pairs.

The fitting parameters may include the amplitude of the interference signal corresponding to pathlength pairs.

An input to the fitting operation may include a known optical wavelength.

An input to the fitting operation may include a known or guessed number of pathlength pairs.

DETAILED DESCRIPTION

Chirped Synthetic Wavelength Interferometer

Figure 1:
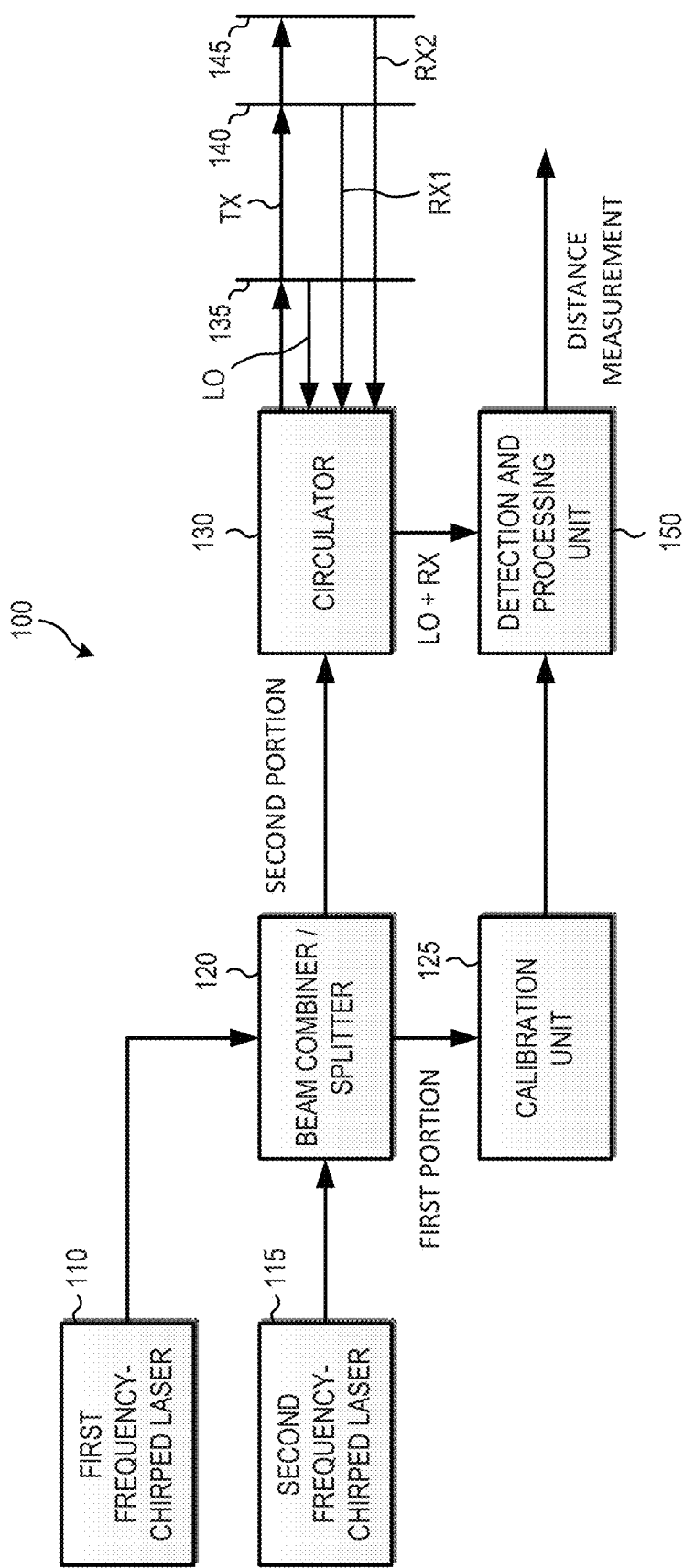
FIG. 1 is a diagram of a chirped synthetic wavelength interferometer according to disclosed embodiments.

FIG. 1 is a diagram of a chirped synthetic wavelength interferometer 100 according to disclosed embodiments. As shown in FIG. 1, the chirped synthetic wavelength interferometer 100 includes a first frequency-chirped laser 110, a second frequency-chirped laser 115, a beam combiner/splitter 120, calibration unit 125 that may contain a length or frequency reference, an optical circulator 130, a reference surface 135, a first sample surface 140, a second sample surface 145, and a detection and processing unit 150.

The first frequency-chirped laser 110 and the second frequency-chirped laser 115 each output light of an optical frequency that changes substantially linearly (chirps) in time over a given chirp duration.

The beam combiner/splitter 120 is configured to receive and combine at least part of the first and second laser outputs into a combined laser output. In some embodiments, a single laser may produce an output with both frequency-chirped components, in which case the beam combination occurs internal to the laser.

The combined laser output from the beam combiner/splitter 120 is then split into a first portion and a second portion. The first portion is directed to the calibration unit 125. The second portion may be directed through the circulator 130 and a plurality of optical paths configured to direct at least part of the combined beam onto an optical detector to produce an interference signal.

In FIG. 1, an optical path may include a transmitted portion denoted Tx. An optical path may include reflection from the reference surface 135, the reflected portion from the reference surface 135 being denoted LO. An optical path may include reflection from a first sample surface 140, the reflected portion from the first sample surface 140 being denoted Rx1. An optical path may include reflection from a second sample surface 145, the reflected portion from the second sample surface 145 being denoted Rx2. At least two of the optical paths are configured to direct light via the circulator 130 to the detection and processing unit 150 to produce an interference signal. It is understood that a sample surface 140, 145 may also serve as the reference surface. Moreover, it is understood that an optical path may not include a surface. For instance, as is common for coherent detection, a reference optical path may be an optical fiber that bypasses the optical circulator 130 and is combined with the Rx after the circulator 130 and before the detection and processing unit 125. It is understood that any optical path is included in this disclosure. The detected interference signal is processed with information from the calibration unit 125 to determine the absolute distance separation between any of the surfaces.

A mathematical description of the interference signal produced by combining the LO and Rx1 resulting from one of the frequency-chirped laser outputs may follow from the formalism provided in Reference [Z. W. Barber, et al., "Accuracy of active chirp linearization for broadband frequency modulated continuous wave ladar," Appl. Opt., 49, 213 (2010)]. However, it is understood that alternate formalism may be applied to other combinations of surfaces and frequency-chirped laser outputs. The time-varying electric field for the LO may be represented in the form:

$$E_{LO}(t,z=0) = E_0 e^{-i(\omega_0 t + 1/2 \alpha t^2)} \tag{4}$$

where $\omega_0$ is the angular optical frequency at the beginning of the chirp, and $\alpha = 2\pi\kappa$ is the angular chirp rate, where $\kappa$ is the frequency chirp rate. The Rx1 field may be modeled by propagating the LO field to the sample surface and back. To accomplish this, one may first Fourier transform the LO field to the frequency domain to yield $$E_{LO}(\omega, z=0) = \frac{E_0}{\sqrt{2\pi}} \int_{-\infty}^{\infty} e^{-i(\omega_0 t + \frac{1}{2}\alpha t^2)} e^{i\omega t} dt = E_0 \frac{1-i}{\sqrt{2\alpha}} e^{i\frac{(\omega-\omega_0)^2}{2\alpha}} \tag{5}$$

To model the return field, one may then propagate the LO field to a sample surface and back to the reference surface by applying a Taylor expanded form of the propagator $e^{i\beta z}$ to yield $$E_{Rx}(\omega, Z=2R) = E(\omega, z=0)e^{i2\beta_0 R}e^{i2\beta_1(\omega-\omega_0)R}e^{i2\beta_2(\omega-\omega_0)^2 R}. \tag{6}$$

Here R is the range or separation between the reference surface 135 and a sample surfaces, 140, 145, and $$\beta_0 = \frac{\omega_0 n}{c}, \beta_1 = \left.\frac{\partial \beta}{\partial \omega}\right|_{\omega=\omega_0} = \frac{1}{v_g}, \text{ and } \beta_2 = \left.\frac{\partial^2 \beta}{\partial \omega^2}\right|_{\omega=\omega_0}.$$

Also, n is the refractive index of the medium between the reference and a sample surface, and $v_g$ is the group velocity in the medium. The time-domain description of the field reflected from a sample surface 140, 145, back to the reference surface 135, may be given by:

$$E_{Rx}(t, z=2R) = E_0 \sqrt{\frac{\alpha'}{\alpha}} e^{-i(\omega_0(t-2\frac{n}{c}R)+\frac{1}{2}\alpha'(t-2\beta_1 R)^2)} \tag{7}$$

where:

$$\alpha' = \frac{\alpha}{1+2R\alpha\beta_2} \tag{8}$$

The interference between the fields $E_{LO}$ and $E_{Rx}$ may generate a signal of the form $$S(t) \sim E_{LO}(t, z=0)E_{Rx}(t, z=2R) \sim \tag{9}$$

$$e^{-i(2\omega_0 \frac{n}{c}R - \frac{1}{2}\alpha'(2\beta_1 R)^2 + 2R\alpha'\beta_1 t + \frac{1}{2}(\alpha-\alpha')t^2)}$$

For cases where dispersion is small, the terms involving $\beta_2$ and $\beta_1^2$ may be neglected, and the signal may be adequately approximated by:

$$S(t) \sim e^{-i(2R\alpha\beta_1 t + 2\omega_0 \frac{n}{c}R)} \tag{10}$$

To allow for two simultaneous frequency-chirped laser outputs and an arbitrary number of sample surfaces, Equation (10) may be generalized to the form:

$$S(t) \sim \sum_{j=1}^{2} \sum_k e^{-i(2\pi f_{beat,j,k} t + \phi'_{j,k})} \tag{11}$$

where the subscript j is used to identify the laser chirp (1=first or 2=second) and the subscript k is used to identify the particular pair of surfaces (typically the reference and one sample surface) that are interfering.

The variable $f_{beat,j,k}$ is the measurable FMCW beat frequency and is given by:

$$f_{beat,j,k} = 2R_k \kappa_j \beta_{1,j}. \tag{12}$$

With $f_{beat,j,k}$ measured, this equation may be used to determine the range between surfaces through:

$$R_k = \frac{f_{beat,j,k}}{2\kappa_j \beta_{1,j}} \quad (13)$$

which may be determined with a resolution and precision given by Equation (1) and Equation (3), respectively, when chirp nonlinearities and other noise sources can be neglected. The phase term in Equation (11) is defined by:

$$\phi'_{j,k} = 2\pi \upsilon_j \frac{2n_j R_k}{c} \quad (14)$$

where $\upsilon_j = \omega_j/2\pi$ is the optical frequency of the j-th laser at the start of the chirp. $\phi_{j,k}$ represents the traditional interferometer phase, which can only be measured modulo $2\pi$. The physically measurable phase is given by:

$$\phi_{j,k} = \phi'_{j,k} - 2\pi m_{j,k} = 2\pi \left( \upsilon_j \frac{2n_j R_k}{c} - m_{j,k} \right) \quad (15)$$

where $m_{j,k}$ is an integer representing the number of standard interferometer fringes between the two surfaces for the laser with starting frequency $\upsilon_j$. Equation (15) can be rearranged to determine the range between the surfaces through $$R_k = \frac{\lambda_j}{2n_j} \left( \frac{\phi_{j,k}}{2\pi} + m_{j,k} \right), \quad (16)$$

where $\lambda_j$ is the vacuum wavelength of the $j^{th}$ laser at the start of the chirp. While this equation may be used to determine the range with very high precision given by Equation (3) with Equation (2) in the ideal case, it also highlights the standard interferometer fringe ambiguity problem because $m_{j,k}$ is typically large and unknown. However, if the range can be determined via a separate measurement to considerably better than a fringe (i.e. break the fringe ambiguity), then one may take full advantage of Equation (16). The fringe number may be obtained from a separate measurement by solving the equation $$m_{j,k} = \text{ROUND}\left[ \frac{2n_j R_k}{\lambda_j} \right] \quad (17)$$

Another useful quantity that can be extracted from the measurement described by Equation (11) is the synthetic interferometer phase, which is given by $$\phi_{2,k} - \phi_{1,k} = \phi'_{2,k} - \phi'_{1,k} - 2\pi l_k = 2\pi \left[ (n_2\upsilon_2 - n_1\upsilon_1)\frac{2R_k}{c} - l_k \right], \quad (18)$$

where $l_k$ is an integer representing the number of synthetic interferometer fringes between the two surfaces. The synthetic fringe number may be determined by a separate measurement of $R_k$ and may be calculated using $$l_k = \text{ROUND}\left[ \frac{2R_k}{\lambda_{synth}} \right] \quad (19)$$

where the well-known synthetic wavelength is given by $$\lambda_{synth} = \frac{1}{\left| \frac{n_2\upsilon_2 - n_1\upsilon_1}{c} \right|} = \frac{\lambda_1 \lambda_2}{|n_2\lambda_1 - n_1\lambda_2|} \quad (20)$$

The synthetic fringe number $l_k$ may be smaller than $m_{j,k}$ and may therefore be measured more easily from a practical standpoint. With known $l_k$, Equation (18) can be rearranged to determine the range through $$R_k = \frac{\lambda_{synth}}{2} \left( \frac{\phi_{2,k} - \phi_{1,k}}{2\pi} + l_k \right), \quad (21)$$

Similarly, Equation (21) can be used to determine the absolute distance or separation between the surfaces with very high precision given by Equation (3) with Equation (2) in the ideal case.

All three measurable quantities (the FMCW heterodyne beat frequency of Equation (12), the synthetic interferometer phase of Equation (18), and the standard interferometer phase of Equation (15) may be obtained from one measurement, represented by Equation (11). It is possible to use these measurable quantities, or a subset of them, to determine the range from the reference surface 135 to a sample surface 140, 145 with very high precision and accuracy.

Method of Operation

Figure 2:
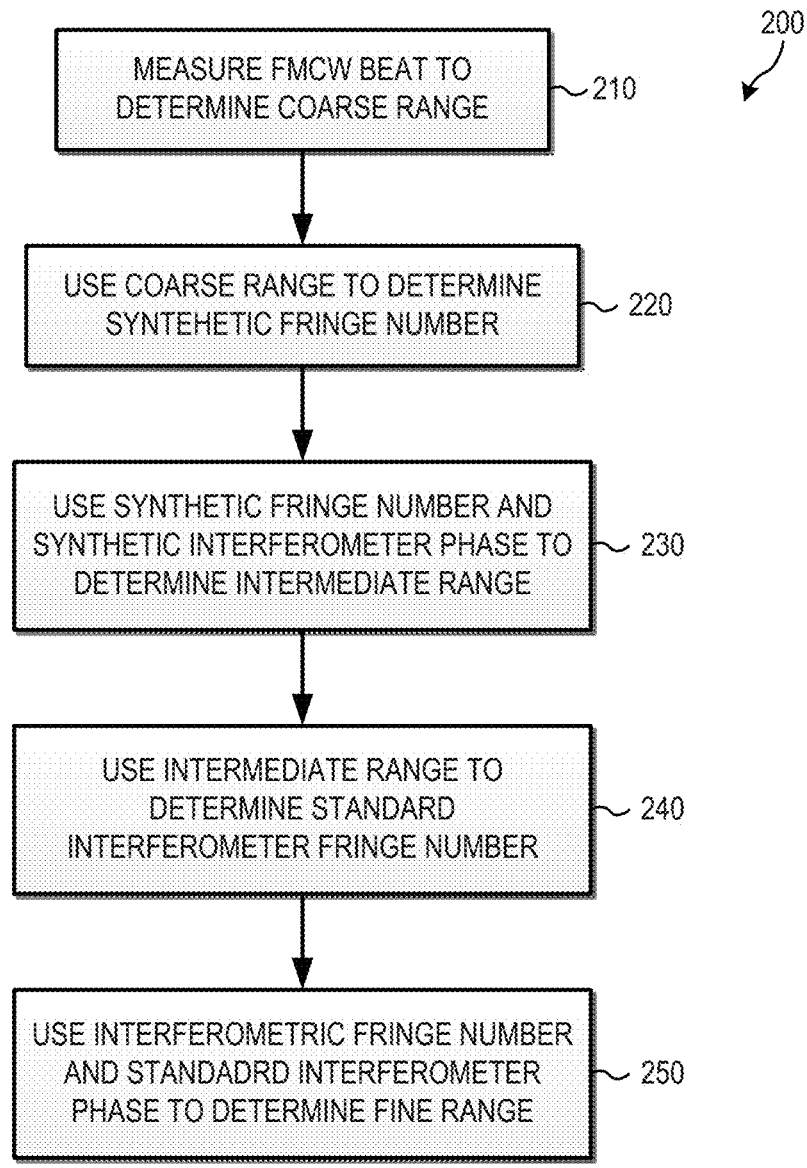
FIG. 2 is a flowchart showing the operation of the chirped synthetic wavelength interferometer according to disclosed embodiments.

FIG. 2 is a flowchart 200 showing the operation of the chirped synthetic waveform interferometer 100 according to disclosed embodiments.

As shown in FIG. 2, a sequence of steps to determine the range from the reference surface 135 to a sample surface 140, 145 with very high precision and accuracy may include:

Measuring the frequency-modulated continuous-wave (FMCW) beat $f_{beat,j,k}$ using at least one chirped laser to determine the range $R_k$ coarsely using Equation (13). (210)

Using the coarse range measurement to determine the synthetic fringe number, $l_k$ using Equation (19). (220)

Using the synthetic fringe number $l_k$ and a measured synthetic interferometer phase to determine an intermediate range through Equation (21). (230)

Using the intermediate range measurement to determine the interferometer fringe number, $m_{j,k}$ for at least one laser using Equation (17). (240)

Using the interferometer fringe number $m_{j,k}$ and the measured standard interferometer phase to determine the fine range through Equation (16). (250)

Two Linearized Frequency-Chirped Laser Embodiment

In order to determine the fringe numbers $l_k$ and $m_{j,k}$ without error, the coarse and intermediate ranges $R_k$ should be measured with uncertainty much better than the synthetic and standard interferometer wavelengths, respectively. However, the prior art identifies nonlinearities in the frequency chirp or phase as factors that degrade the resolution, precision, and accuracy of the results or that necessitate complex components and processing to mitigate. To improve upon the prior art, the disclosed design uses linearized frequency-chirped lasers, which enable range measurements to closely approach the resolution and precision shown in Equation (1) and Equation (3), respectively.

While optical sideband chirps by means of external modulation (e.g. an electro-optic modulator) can be straightforward to achieve up to about 10 GHz and exhibit very low excursions from linearity, this technique can become complex and expensive much beyond 10 GHz. On the other hand, >10 GHz chirps of an optical carrier can be routinely achieved by changing the current, temperature, or mechanical cavity length of, for instance, semiconductor distributed feedback (DFB) lasers, vertical cavity surface emitting lasers (VCSELs), and external cavity diode lasers (ECDLs). However, not until recently have passive and active techniques been developed to linearize optical chirps over large bandwidths (>>10 GHz).

One example embodiment uses two actively linearized frequency-chirped lasers 110, 115 in the configuration shown in FIG. 1. While active linearization may be preferred over passive linearization due to the improved laser coherence that active linearization affords, passively linearized lasers may also be used. Moreover, it is also understood that the one may also adjust the measurement clock to produce uniform K-space sampling as performed in Reference [Opt Express. 2010 Apr. 26; 18(9): 9511-9517]. To achieve critical aspects of this invention, the frequency excursions from perfect linearity are preferably less than about 10 MHz during the chirp. Each linearized frequency-chirped laser for this example embodiment may exhibit a chirp over about 100 GHz of optical bandwidth as shown in FIG. 3.

Figure 3:
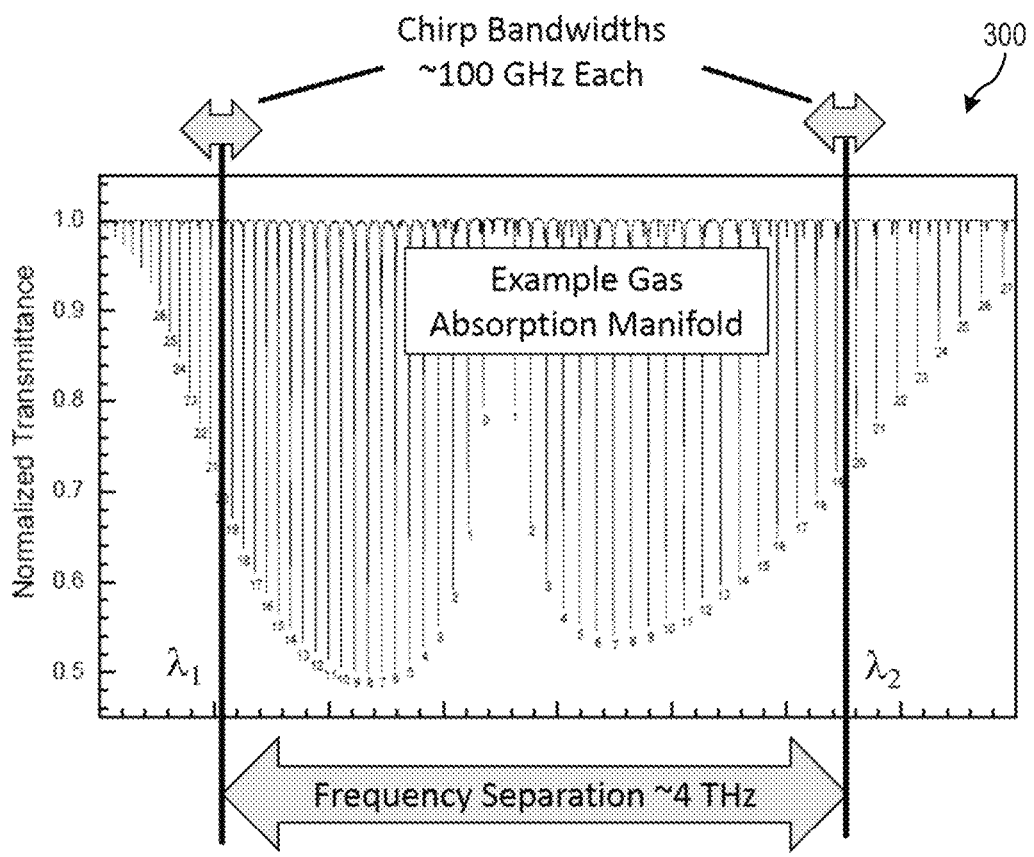
FIG. 3 is a diagram showing the frequency bandwidths and separation for linearized frequency-chirped lasers, as well as the absorption manifold of an example reference gas, according to disclosed embodiments.

FIG. 3 is a diagram 300 showing the frequency bandwidths and separation for two linearized frequency-chirped lasers, as well as the absorption manifold of an example reference gas that may be used in the calibration unit 125, according to disclosed embodiments.

The lasers may be chirped simultaneously in opposite directions, as disclosed in U.S. Pat. No. 5,371,587. Using at least one of these lasers, the coarse range, $R_k$, may be determined using Equation (13). With linearized frequency-chirped lasers this measurement may be made with a resolution of about 1.5 mm and a precision of less than about 5 µm from Equation (1) and Equation (3), respectively, assuming 50 dB SNR for a 1 ms integration time.

For this embodiment the centers of the two laser chirp bandwidths may be spaced by about 4 THz, as shown in FIG. 3. In this case, the coarse range measurement precision of <5 µm is much smaller than the synthetic wavelength, which is about 40 µm. Therefore, the coarse range measurement may be used to accurately determine the synthetic fringe number using Equation (19) with or without averaging multiple measurements when linearized frequency-chirped lasers are used.

With knowledge of the correct synthetic fringe number, measurement of the synthetic interferometer phase may be used to determine the intermediate range through Equation (21). By using linearized frequency-chirped lasers, and therefore linear phase, the intermediate range may be determined with a precision of about 60 nm using Equation (2) and Equation (3), and again assuming a 50 dB SNR. Using lasers with a wavelength near 1.5 µm, 60 nm precision is sufficient to enable accurate determination of the standard interferometer fringe number, $m_{j,k}$, for either or both lasers, through Equation (17).

Figure 4A:
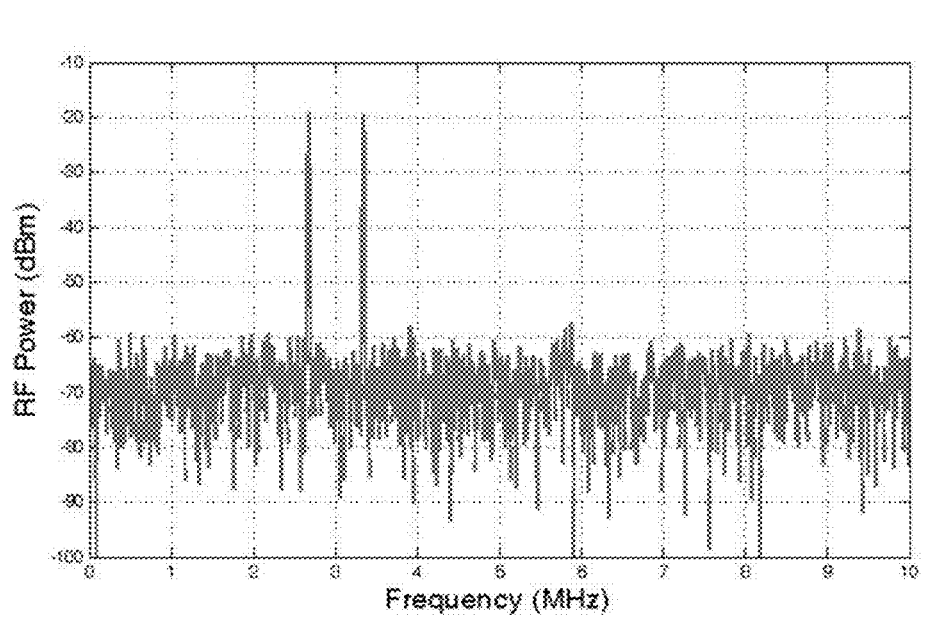
FIG. 4A is a plot of model results showing frequency-modulated continuous-wave (FMCW) beat notes in the frequency domain corresponding to one surface, but two lasers with different chirp rates, according to disclosed embodiments.
Figure 4B:
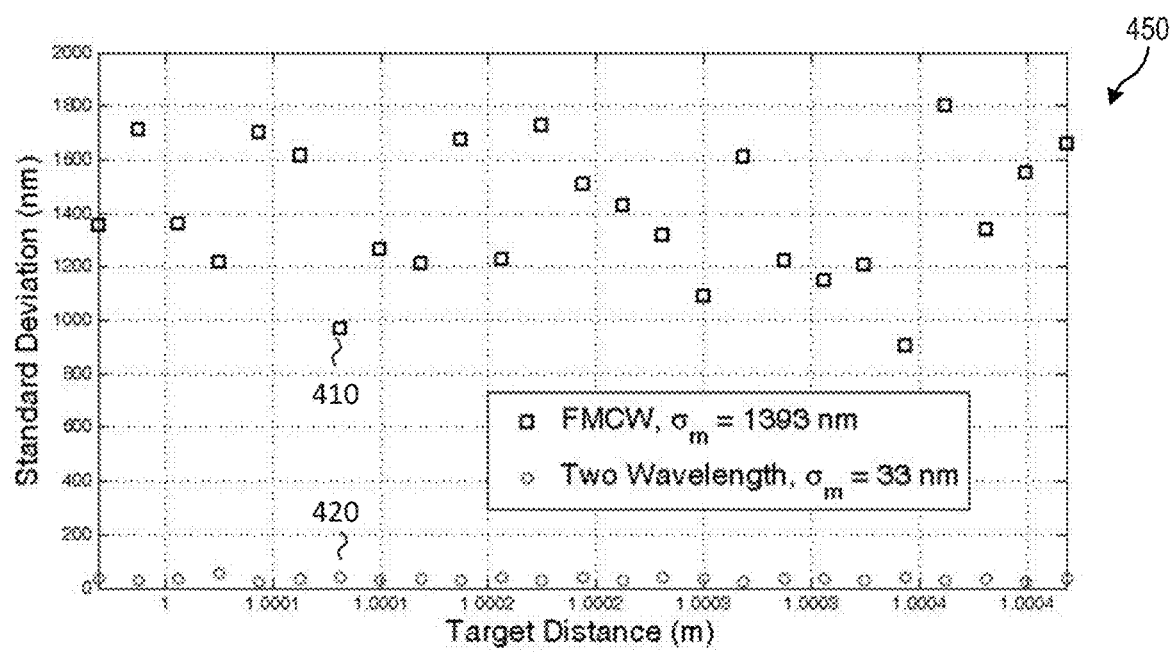
FIG. 4B is a graph of model results showing the resulting FMCW (1.274 µm standard deviation) and synthetic wavelength (35 nm standard deviation) precisions, according to disclosed embodiments.

FIG. 4A is a plot 400 of model results showing frequency-modulated continuous-wave (FMCW) beat notes in the frequency domain corresponding to one surface, but two lasers, each with a different chirp rate, according to disclosed embodiments; and FIG. 4B is a graph of the range measurement results showing the resulting FMCW (1.393 µm standard deviation) and synthetic wavelength (33 nm standard deviation) precisions, according to disclosed embodiments.

In particular, FIG. 4A shows the simulated range profile for one sample surface and two lasers (one peak for each laser). The lasers are separated in optical frequency by 4 THz. FIG. 4B shows the resulting simulated precision that can be obtained by fitting the range peaks to find their centers. The squares 310 represent coarse range measurements (precision=1.393 µm), while the circles 320 represent the intermediate range measurements (precision=33 nm).

With knowledge of the correct standard fringe number, measurement of the standard interferometer phase may be used to determine the fine range through Equation (16). By using linearized frequency-chirped lasers, and therefore linear phase, the fine range may be determined with a precision of about 2 nm using Equation (2) and Equation (3), and again assuming a 50 dB SNR. In determining a range for which the laser light enters a surface from low to high index of refraction (e.g. from air to glass), the well-known 180° phase flip of the reflected light from that surface should be included in the calculation of the range. In that case, $\phi_{j,k}$ may be replaced by $\phi_{j,k}-\pi$ in Equation (16). It is also understood that refractive index and dispersion in the material between surfaces may need to be accounted for to accurately determine range. This example embodiment shows that the use of linearized frequency-chirped lasers enable a range measurement with 2 nm Cramer-Rao-limited precision in a 1 ms measurement time.

In determining the absolute distance, accuracy may be equally as important as precision and again the use of linearized frequency-chirped lasers may be important to achieve fine accuracy. Therefore, one of the output paths of the beam splitter/combiner 120 in FIG. 1 (a first portion) may be received by the calibration unit 125 of the system to accurately determine the chirp rate $\kappa_j$ for each laser for the FMCW measurement, the difference in the optical frequencies chirps ($\upsilon_2-\upsilon_1$), and the optical frequency for at least one laser chirp $\upsilon_j$.

In this embodiment, a spectroscopic gas cell may be used in the calibration unit 125 to determine these needed parameters. Fundamental atomic or molecular absorption lines provide wavelength references that are very stable under changing environmental conditions, such as temperature and pressure variations or the presence of electromagnetic fields. (See, e.g., S. L. Gilbert, W. C. Swann, and Chih-Ming Wang, "Hydrogen Cyanide H13C14N Absorption Reference for 1530 nm to 1565 nm Wavelength Calibration—SRM 2519a", NIST Special Publication 260-137, 2005 Edition.)

In this embodiment, a NIST-traceable H13C14N gas cell may be used with typical absorption line spacings of about 50-105 GHz. During each laser's chirp the optical frequency may be swept over at least two absorption lines. With well-known frequency separation of the lines, linearized frequency chirps, and accurate measurement timing, it is therefore readily possible to calculate the chirp rate through $\kappa_j=\phi\nu/\Delta t$ where $\Delta\nu$ is the frequency separation between two absorption lines and $\Delta t$ is the time for the laser frequency to be swept between the same two lines. It is understood that other absorption characteristics such as the width of a single line could also be used in addition to or instead of the separation between absorption lines.

While the absolute frequencies of the absorption lines are known to about 5-25 MHz, the most accurately known lines can be chosen and in practice the frequency spacing between adjacent lines can be determined better than this. With an absorption line separation known to better than 1 MHz, and a frequency separation of 100 GHz between absorption lines, the chirp rate $\kappa_j$, and thus the FMCW distance measurement, may therefore be calibrated by this method to better than about one part in 10. However, this determination of $\kappa_j$ also requires that the deviations of the laser frequency from a perfectly linear chirp remain significantly under about 10 MHz. This condition may be achieved using either passive or active chirp linearization techniques, or by adjusting the measurement clock to produce uniform K-space sampling.

The quantity $(\upsilon_2-\upsilon_1)$, which determines the synthetic wavelength, may be calibrated in a similar manner, but the separation between the applicable absorption lines is about 4 THz for the present embodiment, as shown in FIG. 3. In this case, the absolute optical frequency at the start of the chirp for each laser may be determined by chirping across a suitable H13C14N absorption line. One may measure the time difference, $\Delta t$, between the start of the chirp and the time that the laser frequency matches the center frequency of an absorption line, $\upsilon_{ref}$. By using a linearized frequency-chirped laser with frequency deviations from linearity of <10 MHz and calibrated chirp rate, $\kappa_j$, one may then determine the optical frequency of the start of the chirp using $\upsilon_j=\upsilon_{ref}-\kappa_j\Delta t$. By using a gas cell for which the separation $(\upsilon_2-\upsilon_1)$ can also be determined to better than 10 MHz, this may provide calibration of the distance based on the synthetic interferometer phase to an accuracy of better than about three parts in $10^6$. The synthetic wavelength distance measurement may therefore break the standard interferometer fringe ambiguity for the present embodiment for distances and thickness of up to about 30 cm.

Similarly, by chirping across an absorption line, at least one of the laser start frequencies $\upsilon_j$ can be determined to about 5 parts in $10^8$ (10 MHz accuracy out of 200 THz optical frequency). This indicates that absolute distance may be calibrated to the nanometer and sub-nanometer scale for distances and thickness up to about 30 cm. Improved wavelength references and chirp linearization may be used to increase this distance. The disclosed technique of sweeping over absorption features and utilizing the frequency and phase linearity of linearized frequency chirped lasers to calibrate the chirp rate and the optical frequencies $\upsilon_1$ and $\upsilon_2$ in this patent is simpler and potentially faster than the previously disclosed technique of stabilizing the lasers to absorption features. It is understood that the refractive index, group refractive index and dispersion may need to be known to the same or better accuracy than the optical frequencies and chirp rates in order to achieve the desired performance.

Single Laser Embodiment

It is also possible to perform a form of chirped synthetic wavelength measurements using a single frequency-chirped laser instead of two or more. The disclosed technique is related to previous incoherent length metrology techniques that measure the RF phase of optical intensity modulation. (See, e.g., I. Fujimay, S. Iwasaki and K. Seta, "High-resolution distance meter using optical intensity modulation at 28 GHz," Meas. Sci. Technol. 9 (1998) 1049-1052, and A. Barker, "Performance enhancement of intensity-modulated laser rangefinders on natural surfaces," SPIE Vol. 5606 (2004).) However, the previous methods may be degraded by reflections from surfaces other than the sample surface or by low signal levels, and may require high receiver bandwidth.

Figure 5:
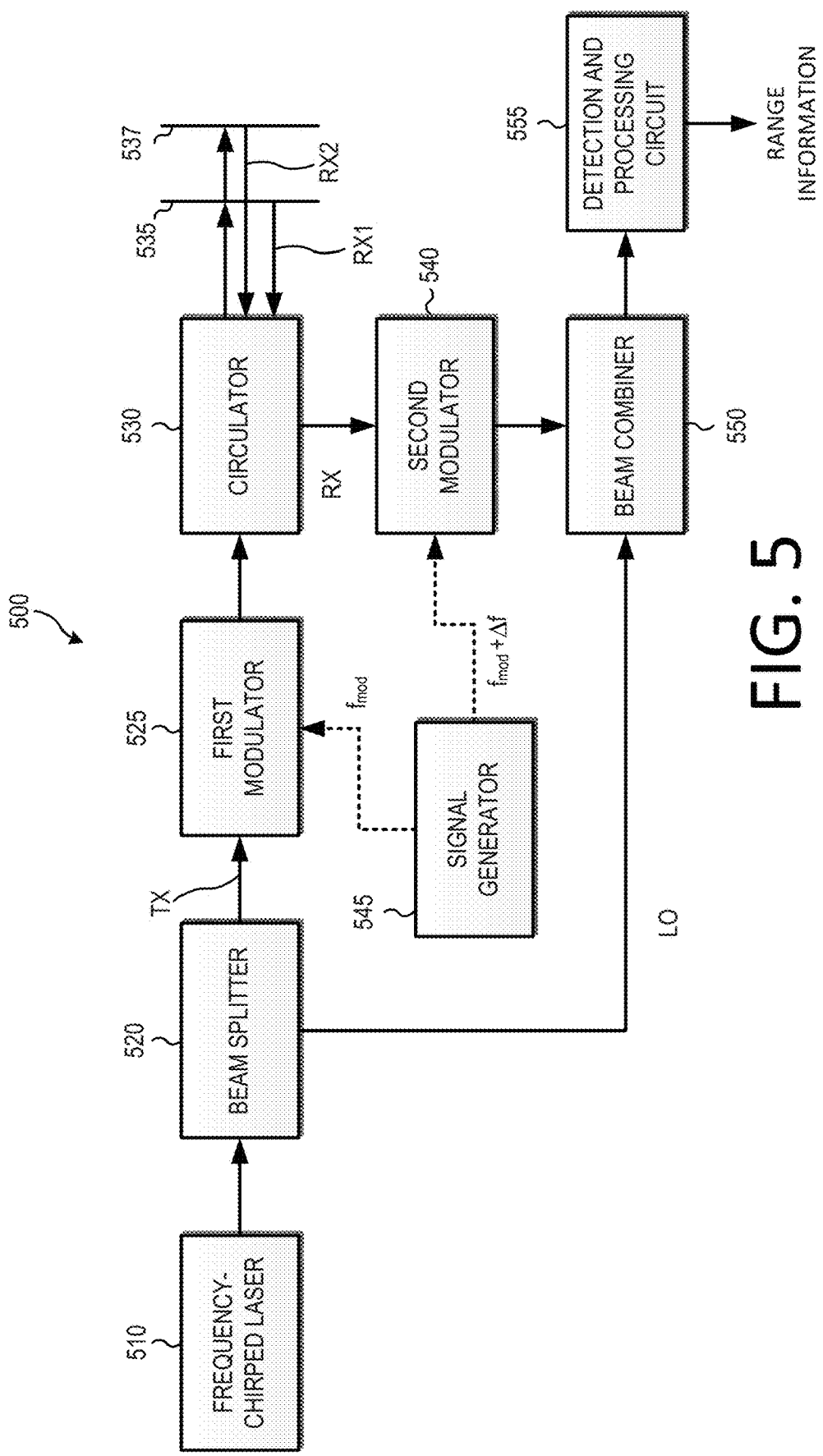
FIG. 5 is a diagram showing components used in a single-laser chirped synthetic wavelength interferometry (SWI), according to disclosed embodiments.

FIG. 5 is a diagram showing components used in a single-laser synthetic wavelength interferometer (SWI) 500, according to disclosed embodiments. As shown in FIG. 5, the single-laser synthetic wavelength interferometer 500 includes a frequency-chirped laser 510, beam splitter 520, a first modulator 525, a circulator 530, a measurement surface 535, a second measurement surface 537, a second modulator 540, a signal generator 545, a beam combiner 550, and a detection and processing unit 555.

As shown in FIG. 5, the output from a frequency-chirped laser may be split into two output portions: a first frequency-chirped laser output portion (Tx) and a second frequency-chirped laser output portion (LO).

The first frequency-chirped laser output portion (Tx) may be transmitted through the first modulator 525 and modulated at frequency $f_{mod}$. This portion may be transmitted to the measurement surface 535, 537. A portion of the reflected or scattered light (Rx1, Rx2) may be directed through the second modulator 540 and demodulated at a slightly different modulation frequency ($f_{mod}+\Delta f$), where $\Delta f$ may be made small to accommodate low detector bandwidths if desired.

Light from the second modulator 540 may be recombined with the second frequency-chirped laser output portion (LO) and the combined light may be directed onto an optical detector in the detection and processing unit 555 to produce an interference signal. The range to target may be obtained by measuring the RF phase shift for $f_{mod}$ accumulated over the transit from the first modulator 525 to the second modulator 540, which is also present at the difference frequency $\Delta f$. This phase shift can be determined by measuring the relative phase difference between two of the RF modulation sidebands corresponding to the coherent carrier.

Mathematically, the detected interference signal may be given by Equation (10) for one laser, one pair of surfaces, where the LO path in FIG. 5 may replace the optical path to the reference surface, and with the inclusion of intensity modulation:

$$S(t) \sim \cos(2\pi f_{mod} t + \phi_1)\cos[2\pi(f_{mod}+\Delta f)t+\phi_2]e^{-i(2\pi f_{beat}t)} \quad (22)$$

where $f_{beat}$ is the standard FMCW heterodyne beat note, $\phi_1$ is the RF phase of modulator 1, $\phi_2$ is the RF phase of modulator 2, the standard interferometer phase term has been neglected, and the DC bias phase of each intensity modulators has been set to zero to simplify the mathematics. Retaining only terms that oscillate at frequencies near $f_{beat}$ yields $$S(t) \sim e^{-i(2\pi(f_{beat}-\Delta f)t-\phi)} + e^{-i(2\pi(f_{beat}+\Delta f)t+\phi)} \quad (23)$$

where $\phi=\phi_2-\phi_1$ is the RF phase difference between the LO path and the Rx path, which contains the physical path length difference. This equation shows that the effect of modulation and demodulation of the chirped laser is to add intensity modulation sidebands (offset from $f_{beat}$ by $\Delta f$) to the standard FMCW carrier beat note. When the DC bias phase of the intensity modulators is set to zero, as has been assumed here, the carrier beat note is suppressed, leaving only the sidebands separated by $2\Delta f$.

Figure 6:
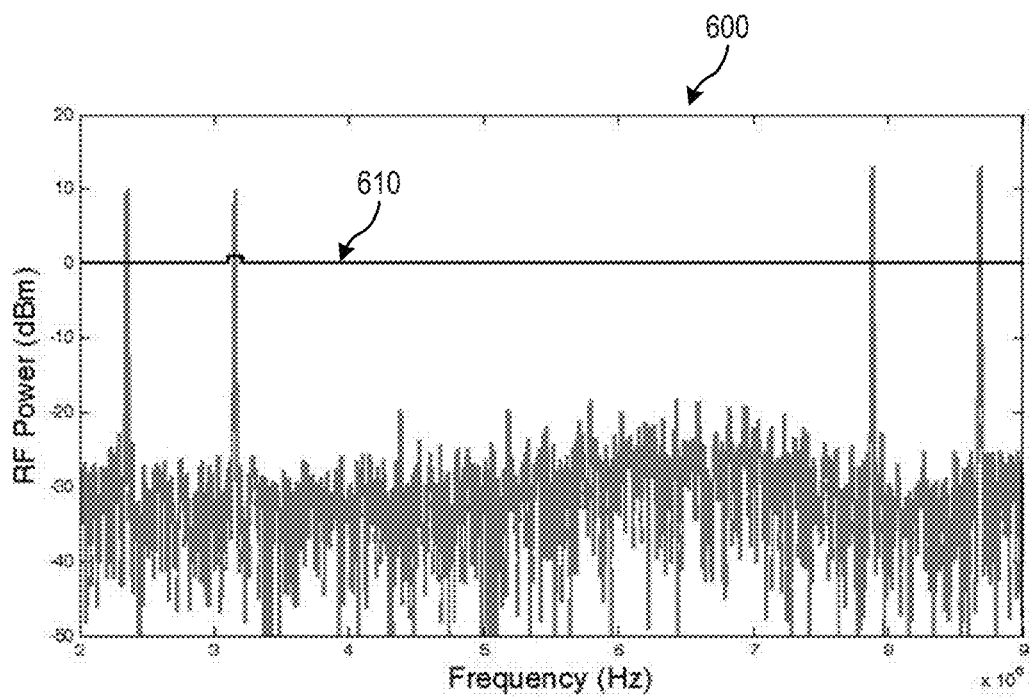
FIG. 6 is a graph of experimental data showing two pairs of intensity modulation sidebands corresponding to two surfaces, according to disclosed embodiments.

FIG. 6 is a plot of experimental data showing two pairs of intensity modulation sidebands corresponding to two surfaces, 535, 537, according to disclosed embodiments. In particular, FIG. 6 shows experimental data of two surfaces, each with a pair of intensity modulated sidebands separated by $2\Delta f$.

The important distance information is contained in the RF phase that may be obtained by subtracting the phase evolution of the upper sideband from that of the lower sideband corresponding to a single surface, which yields $$\phi_{usb}(t)-\phi_{lsb}(t)=2(2\pi\Delta f t+\phi) \quad (24)$$

The phase evolution of each sideband may be obtained by applying a band-pass filter to the desired sideband. An example digital filter function is shown as the black line 610 in FIG. 6. Once this sideband is isolated, one may determine the phase evolution by techniques such as Hilbert transform. One may then demodulate electronically at the offset frequency Δf. Alternatively, one may measure the offset frequency using one of the measurement surfaces 535 as a reference surface in the combined Tx/Rx path after the circulator. This case results in multiple pairs of peaks, as shown in FIG. 6, each pair corresponding to a surface in the beam path. In this case, one may subtract the phase evolution obtained from the one surface 537 as in Eqn (24), from the analogous equation obtained from the reference surface 535. Since Δf is common to both equations, only the RF phase difference between the sample surface and the reference surface remains. This phase difference will yield the distance separation between the reference surface 535 and the sample surface 537. The range between the reference surface 535 and sample surface 537 is then given by $$R = \frac{1}{2}\left(\frac{\phi}{2\pi} + m_{RF}\right)\left(\frac{c}{2f_{mod}}\right), \tag{25}$$

where $m_{RF}$ is an integer that may be determined by a different measurement to remove the RF fringe ambiguity. In particular, the FMCW range measurement can be used to remove the RF fringe measurement.

For this embodiment, frequency and phase noise due to speckle, Doppler, nonlinear frequency chirps, or other sources may be common mode for both of the RF sidebands. Therefore, the subtraction of the phase between the sidebands may suppress such common-mode noise.

Figure 7:
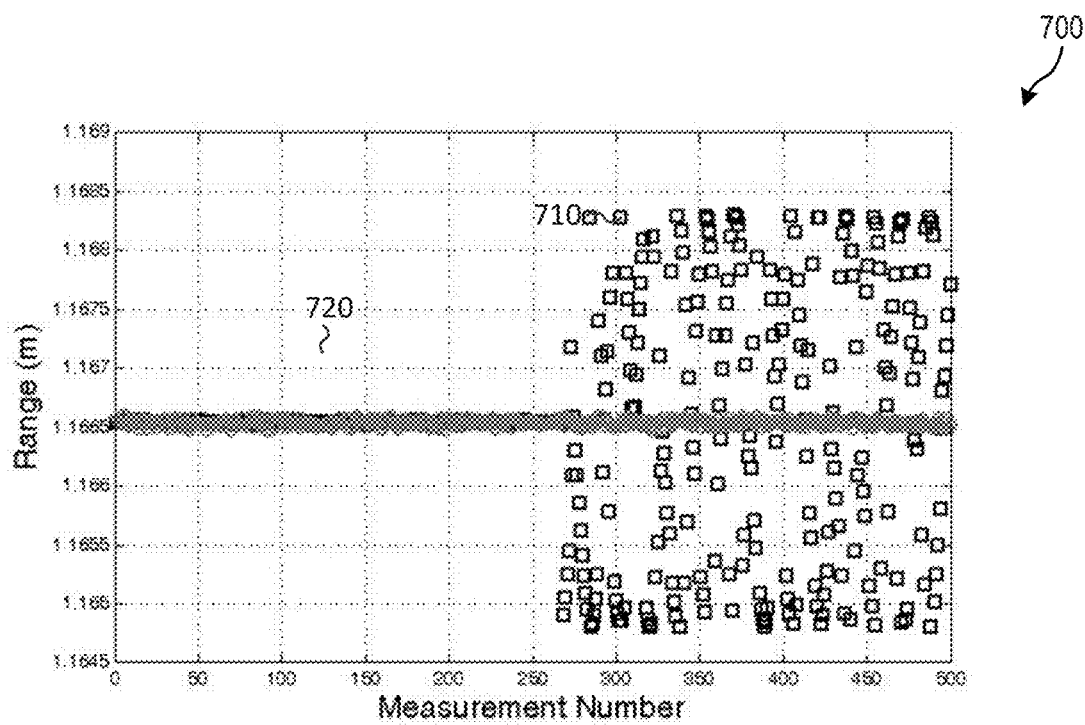
FIG. 7 is a graph of experimental data showing that the disclosed technique is insensitive to sample motion, while the standard FMCW technique exhibits speckle and Doppler errors.

FIG. 7 is a graph 700 of experimental data showing that the disclosed technique is insensitive to sample motion, while the standard FMCW technique exhibits speckle and Doppler errors. In particular, FIG. 7 illustrates a benefit of the phase and frequency insensitivity. For the data in the figure, a sample surface is put into motion starting near measurement number 260. The data shows that range measurements using this disclosed embodiment (circles 720) is insensitive to the motion as compared to the standard FMCW technique (squares 710), which shows significant errors due to Doppler or speckle for the points where motion is present (i.e., points greater than 260 in this embodiment). This insensitivity to errors due to motion can be an advantage over purely FMCW measurements. On the other hand, important advantages over a purely incoherent measurement are that the signal amplitude is amplified by the LO, as it is for the coherent FMCW measurement, and that multiple surfaces may be range-resolved or distinguished. A final advantage is that this measurement technique can be calibrated accurately with accurate knowledge of the RF modulation frequency.

While this embodiment (FIG. 5) shows a frequency-chirped laser for the FMCW technique and certain modulators in certain positions for illustrative purposes, many variants are possible. For instance, other forms of FMCW ladar, such as that using sideband chirps, and other coherent detection techniques may replace the role of a frequency-chirped laser for the FMCW technique to provide discrimination between different surfaces or to capitalize on amplification by the LO. Also, intensity modulators were used for this embodiment, but the use of other modulators (such as frequency or phase) may also be possible.

The first and second modulators 525, 540 may also be placed at different locations in the setup and still enable extraction of the RF phase. For instance, the second modulators 540 may be placed in the LO path. Or, one modulator 525, 540 may be used with both modulation and demodulation frequencies in the combined Tx/Rx path after the circulator. Also, the modulation could be performed using direct modulation of the laser source. If higher RF bandwidth is acceptable, only one modulator or direct modulation is possible and demodulation is not necessary.

Measurement of Multiple Surfaces

A significant drawback of traditional interferometry is the fact that light from multiple surfaces can give distance errors because the multiple surfaces may contribute to one indistinguishable interferometric signal. However, as shown in FIG. 6, the contributions from multiple resolved surfaces can be distinguished by their distinct signal frequencies using the disclosed invention for either the Two Linearized Frequency-Chirped Laser Embodiment or the Single-Laser Embodiment. Such measurements of multiple surfaces may be categorized into one of two cases.

Figure 8:
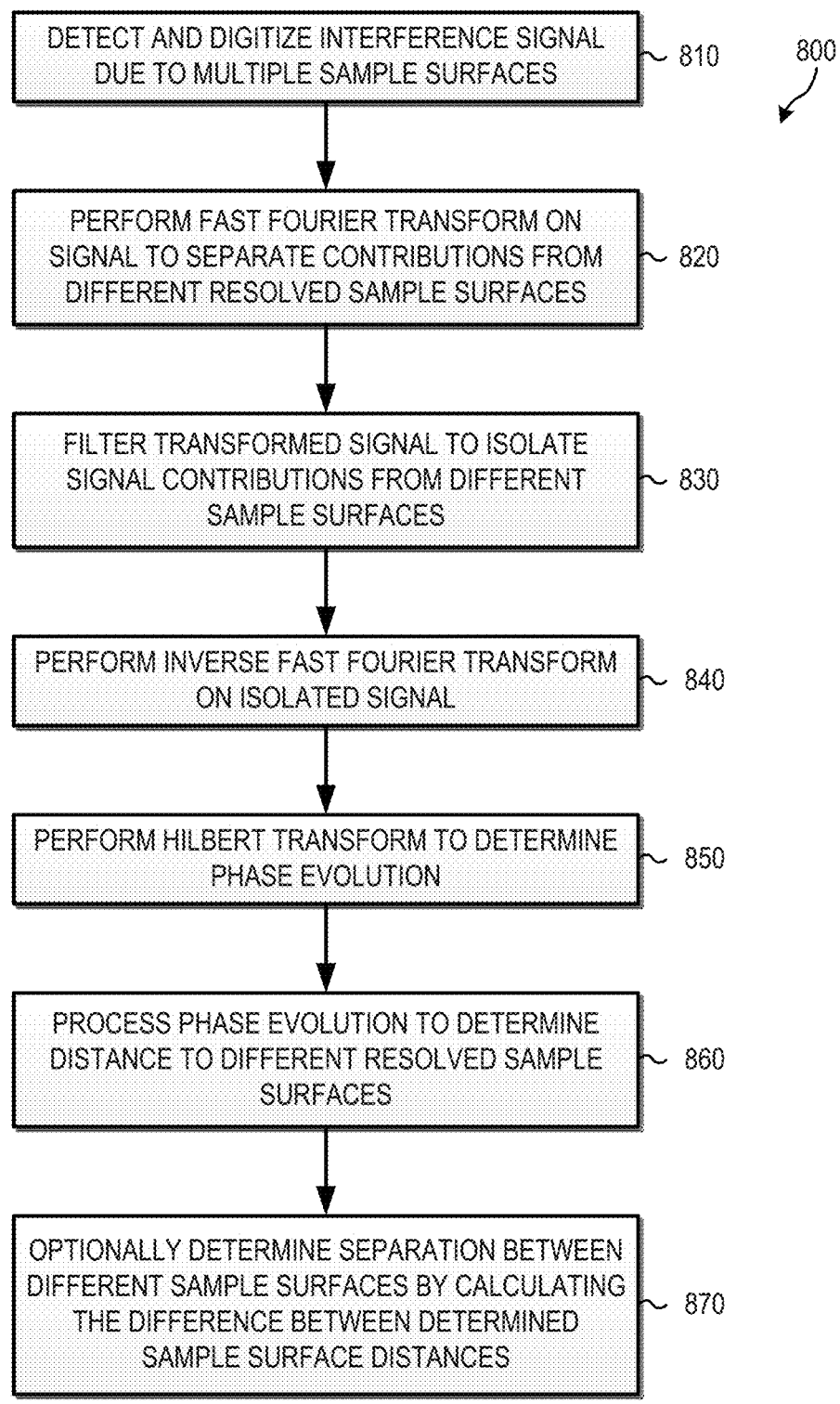
FIG. 8 is a flowchart showing possible steps to isolate, filter, and measure the range to or separation between multiple surfaces for a chirped synthetic wavelength interferometer according to disclosed embodiment.

The first multi-surface case is when the surfaces of interest are well resolved by the FMCW measurement, such as those shown in FIG. 6. In this case, the peaks do not interfere or otherwise affect one another. In this case, one may apply the steps shown in FIG. 8 to determine the range to, or separation between, multiple resolved surfaces. The steps are only shown as an exemplary case. Other alternate steps and methods are also possible to separate the signals corresponding to different surfaces, filter to isolate signals corresponding to different surfaces, or process the signals corresponding to different surfaces to determine the ranges, and optionally determine the separation between multiple resolved surfaces. Moreover, some steps may be omitted. For the exemplary steps shown in FIG. 8, one may first detect and digitize the interference signal resulting from multiple sample surfaces, and possibly multiple lasers. Next, one may perform a fast Fourier Transform to separate the resolved peaks in the RF frequency domain and effectively create a range profile. One may next apply bandpass filters, such as the digital bandpass filters shown by the black trace 610 in FIG. 6, to the signal in the frequency domain to isolate peaks corresponding to different surfaces. This isolation of the peaks may allow one to process the contributions from each surface independently without interference from the other surfaces. For instance, one may next perform a fast Inverse Fourier Transform on the filtered signal to transform back to the time domain. Next, one may perform a Hilbert or other transform to produce the phase evolution of the filtered signal in time (B. Boashash, "Estimating and interpreting the instantaneous frequency of a signal. II. Algorithms and applications," Proceedings of the IEE, vol. 80, no. 4, pp. 540-568, 1992). With this phase evolution signal, one may calculate the parameters $f_{beat,j,k}$ and $\phi_{j,k}'$ that can be used to determine range to the sample surface. $f_{beat,j,k}$ may be obtained from the slope of the phase evolution signal and $\phi_{j,k}'$ may be obtained by the offset of the phase evolution signal. The process may be performed for multiple lasers when the chirp rates of the lasers are different or the peaks from the different lasers are well resolved by some other means. One may optionally subtract the range determinations for multiple sample surfaces to determine the separation between sample surfaces. This technique may be used, for instance, to precisely measure the position of sample surfaces, and therefore determine separation between two sample surfaces by subtracting their ranges.

Figure 9:
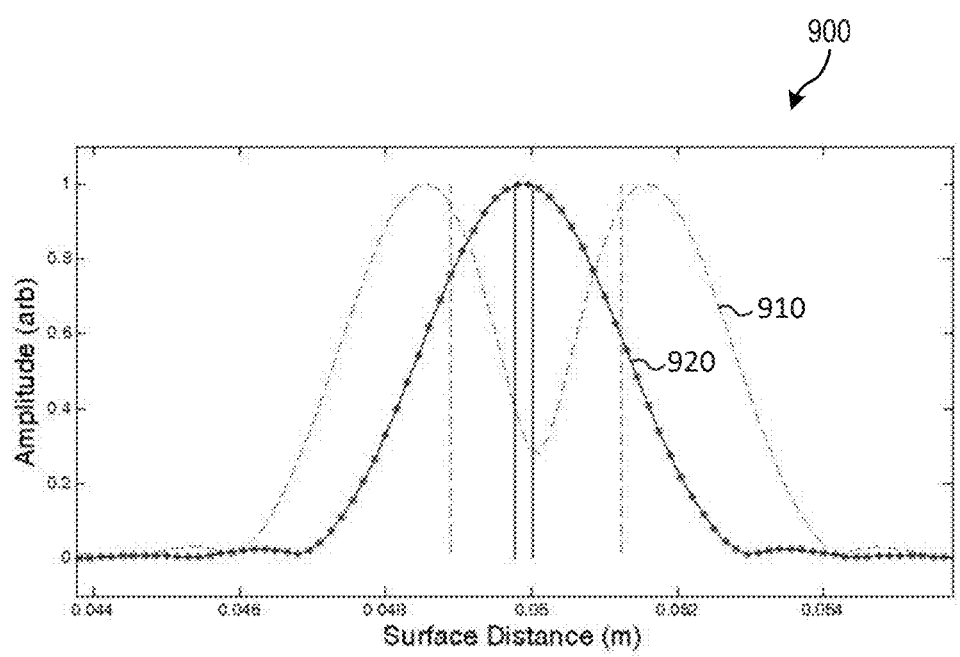
FIG. 9 is a graph of simulated range profile data, fit guess, and fit, according to disclosed embodiments.

The second case for measurement of multiple surfaces is when the surfaces are not well resolved by the FMCW measurement so that the peaks may interfere or otherwise affect one another. In this case, the disclosed embodiments teach how it is still possible to accurately determine the range of each peak, even if the peaks are closely spaced. In this case, it may not be possible to separate and filter the peaks associated with sample surfaces, but the disclosed embodiments teach how it still may be possible to accurately or precisely determine the range to sub-resolved sample surfaces, and their separations, even if the peaks are closely spaced. This determination is complicated by the fact that the measurement is coherent, so the optical phase of the reflection from each surface can dramatically alter the peak shape and corrupt the range determination. FIG. 9 shows simulated range profile data (gray dots) with noise for one laser and two sub-resolved surfaces on a linear vertical scale. Although two surfaces are present, they are not resolved, so only one peak is visually observed in the range profile. Solid vertical lines indicate the true simulated surface locations in the range profile.

Figure 10:
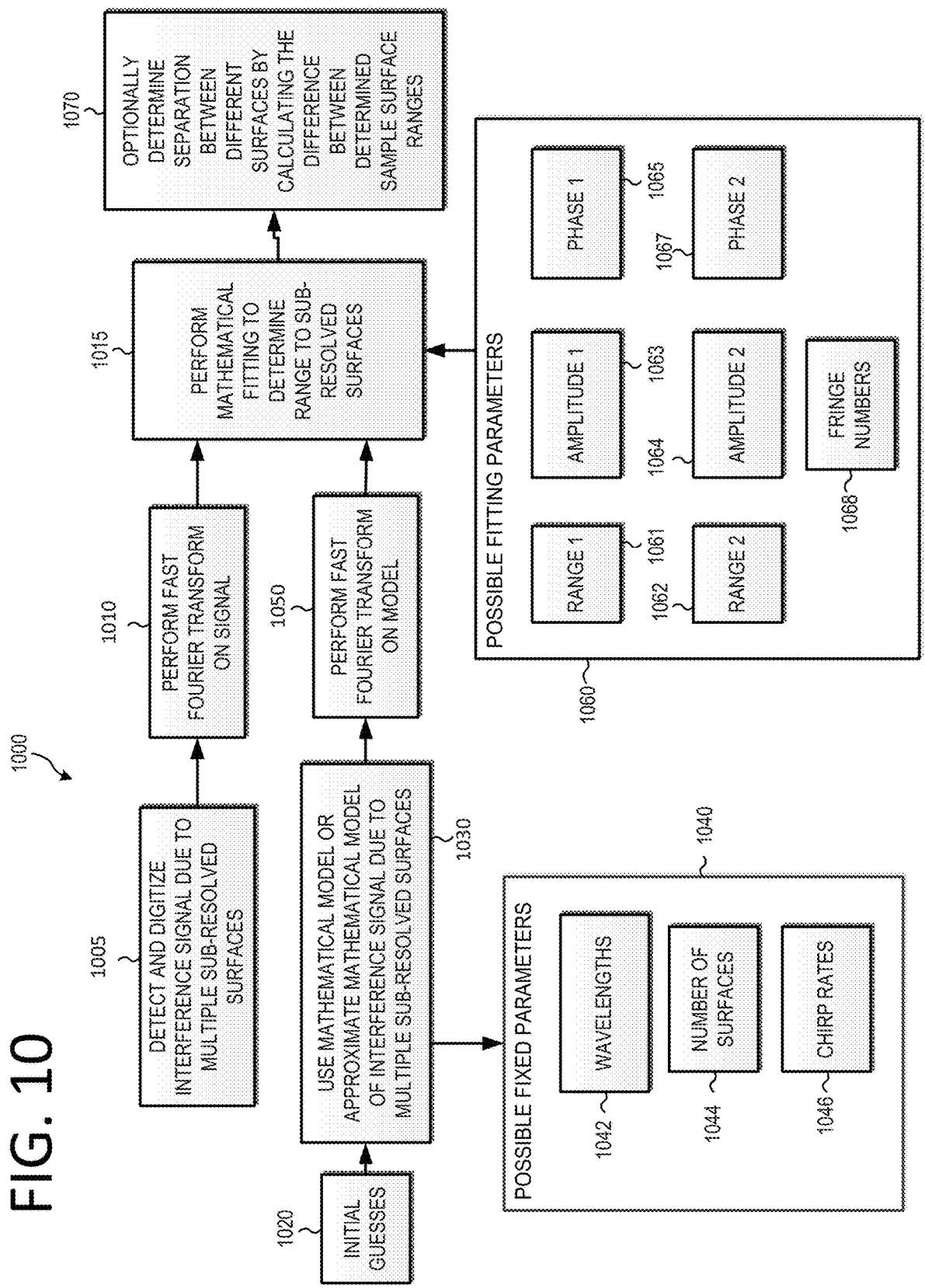
FIG. 10 is a flowchart showing possible steps to determine the distance to or separation between multiple sub-resolved surfaces according to disclosed embodiments.

One may apply the steps shown in FIG. 10 to determine the range to, or separation between, multiple sub-resolved surfaces. The steps are only shown as an exemplary case. It is understood that other alternate steps and methods are also possible to determine the range and possibly the separation between multiple sub-resolved surfaces, and possibly multiple lasers. Moreover, steps may also be omitted. For the exemplary steps shown in FIG. 10, the interference signal resulting from multiple sample surfaces, and possible multiple lasers, may first be detected and digitized (1005). Next, one may perform a fast Fourier Transform (1010) to produce a range profile such as that shown in FIG. 4A or FIG. 9. One may separately start with a mathematical model of the interference signal (1030) such as that described by Eqn (11), which may include multiple sample surfaces and multiple lasers. Fixed parameters (1040) and initial guesses (1020) for fitting parameters may be used. Approximations to the mathematical form may also be used. The fixed parameter inputs (1040) to the mathematical model may include laser wavelengths (1042), chirp rates (1046), and number of sample surfaces (1044), which may be known or determined from other measurements. However, it is understood that the fixed input parameters shown may not be used and other inputs are possible. Also, some fixed parameters shown may also or instead be fitting parameters, such as number of surfaces. Then one may perform a fast Fourier Transform of the modeled interference signal (1050) to produce a model range profile. One may then perform mathematical fitting (1015), such as least squares fitting, between the data and model to determine the range to, or separation between (1070), multiple surfaces. The general mathematical techniques of fitting are well known (P. G. Guest, Numerical Methods of Curve Fitting, Cambridge University Press; Reprint edition (Dec. 13, 2012), ISBN: 9781107646957.) and it is understood that many different fitting techniques may be used. Fitting parameters may include fringe numbers (1068), range (1061, 1062), amplitude (1063, 1064), and phase (1065, 1067) corresponding to different surfaces and lasers. It is understood that not all of these fitting parameters must be used and other fitting parameters may also be used, such as number of surfaces. It is also understood that other configurations and steps that use fitting to determine the position of the sub-resolved peaks are possible. For instance, instead of starting with a mathematical model in the time domain (1030), one may develop a mathematical expression for the interference signal directly in the frequency domain, or an approximation thereof, and apply fitting (1015) without taking the Fast Fourier Transform 1050.

Using fitting of the known functional form of the surfaces given by Eqn (11), or approximations to that functional form, with amplitude (1063, 1064), range (1061, 1062), and phase (1065, 1067) of the measured signals as the fit parameters, the locations of the two surfaces may be determined far better than the range resolution. The dashed curves in FIG. 9 show the range profile resulting from initial parameter guesses for fitting (vertical dashed lines show the initial range guess values). The solid curves show the resulting least squares fit signal for the combined surfaces. The fit range locations are visually indistinguishable from the true locations on the plot. The process of fitting can also be performed iteratively to improve the measurement. For instance, one may perform the fitting process using the interference signal from just one laser to determine a coarse range and thus the synthetic fringe number, $l_{j,k}$. The fitting process can then be performed again with $l_{j,k}$ as an input parameter and with two lasers to determine the intermediate range measurement or the standard interferometer fringe number, $m_{j,k}$. Similarly, the fitting process may then be performed again with $m_{j,k}$ as an input parameter and with one or more lasers to determine the fine range measurement.

Figure 11:
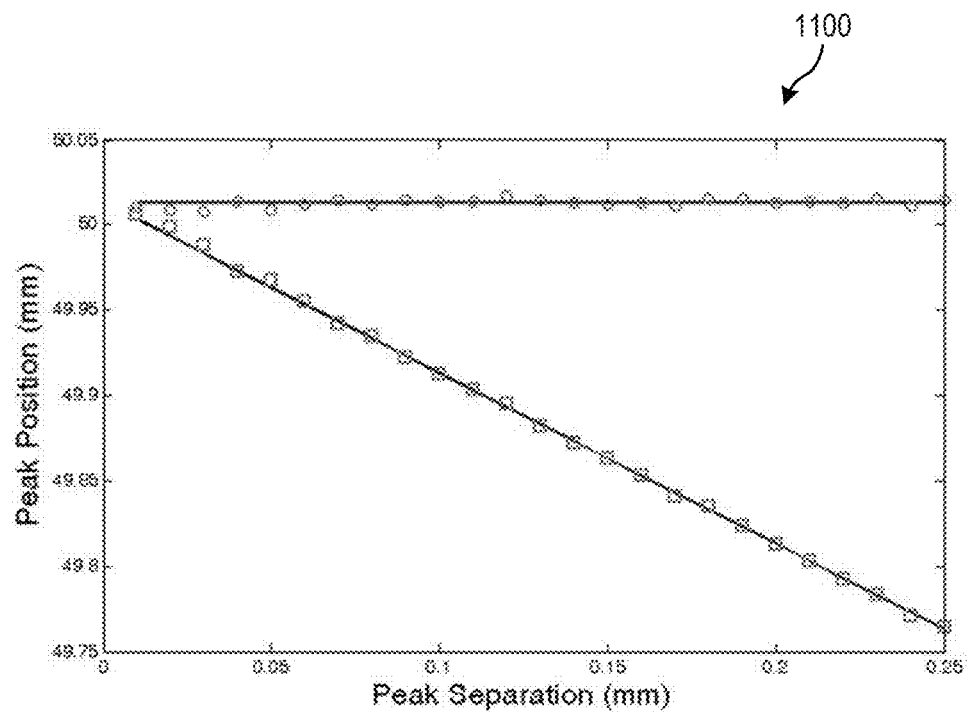
FIG. 11 is a graph of data showing that the positions of two surfaces can be determined far better than the range resolution by fitting even when the surfaces are closely spaced and sub-resolved, according to disclosed embodiments.

FIG. 11 shows the true (black lines) and calculated by fit position (gray circles and squares) positions of the two surfaces for different surface separations. For the case shown, the FMCW range resolution is about 1.5 mm (given by Eqn (1)), but the surface positions can be measured and determined to better than about 10 μm even when the surface spacing is reduced to 10 μm. Moreover, when two lasers are used and the starting optical frequency of each laser is known, Eqn (16) and Eqn (21) can additionally be used to provide more constraints with $l_k$ and/or $m_{j,k}$ as additional fit parameters to further improve the measurement.

What is claimed is:

1. A system comprising:
   a first chirped laser source configured to provide a first laser output having a first optical frequency varying at a first chirp rate;
   a calibration unit comprising at least one gas cell having at least one absorption line, the calibration unit configured to receive a first portion of the first laser output and to output a calibration signal;
   a first plurality of optical paths configured to direct a second portion of the first laser output onto an optical detector to produce a first interference signal; and
   a signal processor configured to receive the first interference signal and the calibration signal, the signal processor further configured to:
   determine a first time based on when the first optical frequency matches a feature of the absorption line of the gas cell during a chirp; and
   determine an interferometer phase based on the first time.

2. The system of claim 1 additionally comprising:
   a second chirped laser source configured to provide a second laser output having a second optical frequency varying at a second chirp rate; and
   a second plurality of optical paths configured to direct a portion of the second laser output onto the optical detector, or a different optical detector, to produce a second interference signal, wherein
   the signal processor is additionally configured to determine a second time based on when the second optical frequency matches a feature of an absorption line of the gas cell, or a different gas cell, during a chirp.

3. The system of claim 2, wherein the first plurality of optical paths and the second plurality of optical paths share at least one common optical path.

4. The system of claim 1, wherein the signal processor is further configured to determine a distance based, at least in part, on the determined interferometer phase.

5. The system of claim 1, wherein the determined interferometer phase is a standard interferometer phase.

6. The system of claim 1, wherein the determined interferometer phase is synthetic interferometer phase.

7. The system of claim 2, wherein the signal processor is further configured to calculate a fast Fourier transform or related transform of the first interference signal, the second interference signal, or both.

8. The system of claim 2, wherein the signal processor is further configured to calculate a Hilbert or related transform of the first interference signal, the second interference signal, or both.

9. The system of claim 2, wherein the signal processor is further configured to apply an electronic or digital filter to the first interference signal, the second interference signal, or both.

10. The system of claim 2, wherein the first chirp rate is different from the second chirp rate.

11. The system of claim 2, wherein the first chirp rate is the same as the second chirp rate.

12. The system of claim 7, wherein the signal processor is further configured to calculate a range profile based on the fast Fourier transform or related transform.

13. A method comprising:
chirping a first laser output having a first optical frequency by varying the first optical frequency at a first chirp rate;
directing a first portion of the first laser output to a calibration unit comprising at least one gas cell having at least one absorption line, wherein the calibration unit is configured to output a calibration signal;
directing a second portion of the first laser output through a first plurality of optical paths onto a detector to produce a first interference signal; and
determining a distance based at least in part on the first interference signal and the calibration signal, wherein determining the distance comprises:
determining a first time when the first optical frequency matches a feature of the absorption line of the gas cell during the chirping; and
determining an interferometer phase based, at least in part, on the first time.

14. The method of claim 13, additionally comprising:
chirping a second laser output having a second optical frequency by varying the second optical frequency at a second chirp rate; and
directing a portion of the second laser output through a second plurality of optical paths onto the optical detector, or a different optical detector, to produce a second interference signal, wherein
determining the distance is also based on the second interference signal, and wherein determining the distance further comprises
determining a second time when the second optical frequency matches a feature of an absorption line of the gas cell, or a different gas cell, during a chirp.

15. The method of claim 14, wherein the first plurality of optical paths and the second plurality of optical paths share at least one common optical path.

16. The method of claim 14, wherein the first chirp rate is different from the second chirp rate.

17. The method of claim 14, wherein the first chirp rate is the same as the second chirp rate.

18. The method of claim 14 wherein determining the distance additionally comprises:
applying a fitting operation to the first interference signal, the second interference signal, or both, based on fitting parameters, wherein the fitting parameters comprise at least an RF frequency of the first interference signal or the second interference signal.

19. The method of claim 14, wherein determining the distance further comprises applying a fast Fourier transform or related transform to the first interference signal, the second interference signal, or both.

20. The method of claim 19, further comprising producing a range profile based on fast Fourier transform, wherein the range profile comprises a first range peak based on the first interference signal and a second range peak based on the second interference signal, and wherein the first range peak and the second range peak are sub-resolved.

21. The method of claim 14, wherein determining the distance further comprises applying a Hilbert or related transform to the interference signal.

22. The method of claim 14, wherein the determining the distance further comprises applying an electronic or digital filter to the interference signal.

23. The method of claim 18, wherein the fitting parameters additionally comprise
an RF phase of the first interference signal or the second interference signal.

* * * * *